*US009542077B2*

(12) United States Patent
Yokomichi

(10) Patent No.: US 9,542,077 B2
(45) Date of Patent: Jan. 10, 2017

(54) INFORMATION PROCESSING APPARATUS, INFORMATION PROCESSING METHOD, INFORMATION PROCESSING PROGRAM, AND RECORDING MEDIUM

(75) Inventor: Takashi Yokomichi, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 295 days.

(21) Appl. No.: 14/348,458

(22) PCT Filed: Apr. 2, 2012

(86) PCT No.: PCT/JP2012/058894
§ 371 (c)(1),
(2), (4) Date: Mar. 28, 2014

(87) PCT Pub. No.: WO2013/046762
PCT Pub. Date: Apr. 4, 2013

(65) Prior Publication Data
US 2014/0237374 A1 Aug. 21, 2014

(30) Foreign Application Priority Data
Sep. 30, 2011 (JP) .................. 2011-215973

(51) Int. Cl.
G06F 3/00 (2006.01)
G06F 3/0482 (2013.01)
G06Q 30/06 (2012.01)

(52) U.S. Cl.
CPC ......... G06F 3/0482 (2013.01); G06Q 30/0601 (2013.01)

(58) Field of Classification Search
CPC .......................... G06Q 30/0601; G06F 3/0482
(Continued)

(56) References Cited

U.S. PATENT DOCUMENTS 7,917,406 B2 * 3/2011 Kido .................... G06Q 10/109
705/26.35
8,601,374 B2 * 12/2013 Parham ................ G06Q 10/107
709/224
(Continued)

FOREIGN PATENT DOCUMENTS

JP 2001-209602 A 8/2001
JP 2006-31655 A 2/2006
(Continued)

OTHER PUBLICATIONS

Translation of International Preliminary Report on Patentability dated Jun. 19, 2012 issued in Patent Application No. PCT/JP2012/058894.
(Continued)

Primary Examiner — William Titcomb
(74) Attorney, Agent, or Firm — Sughrue Mion, PLLC

(57) ABSTRACT

Enlargement of a reference list is prevented by supporting appropriate deletion of transaction objects, which are unnecessary to register in the reference list, from the reference list. An information processing apparatus includes: a selecting means that selects, as candidates for deletion from a reference list, a transaction object associated with a transaction object targeted for operation among transaction objects registered in the reference list, based on reference list information of a user, which is stored in a storing means that stores the reference list information indicating transaction objects registered in the reference list holding a reference to information associated with the transaction objects, when a predetermined operation relating to selection of the transaction object is performed by the user; and a controlling means that suggests the deletion candidates selected by the selecting means.

21 Claims, 13 Drawing Sheets

(58) Field of Classification Search
USPC .......................................................... 715/739
See application file for complete search history.

(56) References Cited

U.S. PATENT DOCUMENTS

| | | | |
|---|---|---|---|
| 8,990,347 B2* | 3/2015 | Schneider | G06Q 10/06 |
| | | | 707/708 |
| 2006/0259867 A1 | 11/2006 | Watson et al. | |
| 2007/0198938 A1* | 8/2007 | Parham | G06Q 10/107 |
| | | | 715/745 |
| 2008/0059607 A1* | 3/2008 | Schneider | G06Q 10/06 |
| | | | 709/218 |
| 2008/0177723 A1 | 7/2008 | Abe et al. | |
| 2008/0288492 A1 | 11/2008 | Gemmell et al. | |

FOREIGN PATENT DOCUMENTS

| | | |
|---|---|---|
| JP | 2008-146624 A | 6/2008 |
| JP | 2009-217636 A | 9/2009 |

OTHER PUBLICATIONS

International Search Report of PCT/JP2012/058894, dated Jun. 19, 2012.

* cited by examiner

FIG.4A
MEMBER INFORMATION DB 12a

| USER ID |
| --- |
| PASSWORD |
| NICKNAME |
| NAME |
| DATE OF BIRTH |
| GENDER |
| ZIP CODE |
| ADDRESS |
| TELEPHONE NUMBER |
| EMAIL ADDRESS |

FIG.4B
GENRE INFORMATION DB 12b

| GENRE ID |
| --- |
| GENRE NAME |
| LEVEL |
| PARENT GENRE ID |
| CHILD GENRE ID LIST |
| USE SEASON INFORMATION |

FIG.4C
SHOP INFORMATION DB 12c

| SHOP ID |
| --- |
| SHOP NAME |
| ZIP CODE |
| ADDRESS |
| TELEPHONE NUMBER |
| EMAIL ADDRESS |
| TRADING GENRE INFORMATION |

FIG.4D
ITEM INFORMATION DB 12d

| ITEM ID |
| --- |
| SHOP ID |
| ITEM CODE |
| GENRE ID |
| ITEM NAME |
| ITEM IMAGE URL |
| ITEM DESCRIPTION |
| ITEM PRICE |

FIG.4E
BROWSING HISTORY DB 12e

| ITEM ID |
| --- |
| BROWSING DATE AND TIME |
| USER ID |

FIG.4F
PURCHASE HISTORY DB 12f

| ORDER CODE |
| --- |
| PURCHASE DATE AND TIME |
| USER ID |
| ITEM ID |
| SHOP ID |
| ITEM CODE |
| NUMBER OF PURCHASES |

FIG.4G
BOOKMARK INFORMATION DB 12g

| USER ID |
| --- |
| ITEM ID |
| REGISTRATION DATE AND TIME |
| RETRIEVAL CONDITION |

INFORMATION PROCESSING APPARATUS, INFORMATION PROCESSING METHOD, INFORMATION PROCESSING PROGRAM, AND RECORDING MEDIUM

CROSS REFERENCE TO RELATED APPLICATIONS

This application is a National Stage of International Application No. PCT/JP2012/058894 filed Apr. 2, 2012, claiming priority based on Japanese Patent Application No. 2011-215973, filed Sep. 30, 2011, the contents of all of which are incorporated herein by reference in their entirety.

TECHNICAL FIELD

The present invention relates to the technical fields of information processing apparatuses that perform processes related to deletion of transaction objects from a reference list holding a reference to information on transaction objects.

BACKGROUND ART

Conventionally, there has been known an electronic commerce website allowing the purchase of transaction objects, such as the purchase of items or the reservation of services. In such a website, there is a web page on which information on transaction objects are posted with respect to each of the transaction objects. Also, such a website provides a function of allowing a user to register arbitrary transaction objects in a reference list. The reference list is, for example, a list holding a reference to information on transaction objects, such as a URL of information on transaction objects. The reference list is referred to as, for example, a bookmark or the like. The user registers, for example, interesting transaction objects, transaction objects as purchase candidates, favorite transaction objects, and the like, in the reference list. This makes it possible to easily access information on the transaction objects from the reference list.

There is a case where the transaction objects registered in the reference list are no longer necessary for the user due to, for example, a change in a user's situation. Therefore, if the user registers the transaction objects in the reference list one after another, unnecessary transaction objects also are included and a large number of transaction objects are registered in the reference list, resulting in the enlargement of the reference list. Thus, there is a case where it is necessary for the user to search a desired transaction object from the reference list and access information on the transaction object. In order to prevent the enlargement of the reference list, the reference list needs to be organized. However, in this case, it is necessary for the user to search unnecessary transaction objects from a large number of transaction objects and delete the unnecessary transaction objects from the reference list. There is a case where it takes time and effort to perform this operation.

In this regard, Patent Literature 1 discloses a technique that collectively deletes URLs a user has not accessed for a predetermined time, among URLs registered in bookmarks.

PRIOR ART LIST

Patent Literature

Patent Literature 1: JP 2001-209602 A

SUMMARY OF THE INVENTION

Problem to be Solved by the Invention

However, in the technique disclosed in Patent Literature 1, since a URL that has not been accessed for a predetermined time is automatically deleted, a URL that is actually necessary for a user may be deleted from a bookmark. Also, in the transaction objects, a transaction object of which information has not been accessed is not always unnecessary from a reference list.

The present invention has been made in view of the above problems and is directed to provide an information processing apparatus, an information processing method, an information processing program, and a recording medium, which can prevent enlargement of a reference list by supporting appropriate deletion of transaction objects, which are unnecessary to register in the reference list, from the reference list.

Means for Solving the Problem

In order to solve the above problem, the invention according to claim 1 is an information processing apparatus comprising:

a selecting means that, when a predetermined operation relating to selection of transaction objects is performed by a user, selects, as candidates for deletion from a reference list, transaction objects associated with a transaction object targeted for operation among transaction objects registered in the reference list, based on reference list information of the user, which is stored in a storing means that stores the reference list information indicating transaction objects registered in the reference list holding a reference to information associated with the transaction objects; and a controlling means that suggests the deletion candidates selected by the selecting means.

According to the present invention, since transaction objects associated with the transaction object targeted for a predetermined operation are suggested, transaction objects highly probable to be unnecessary to register in the reference list can be suggested as the deletion candidates. Therefore, since it is easy to delete the unnecessary transaction objects from the reference list, it is possible to support appropriate deletion of transaction objects, which are unnecessary to register in the reference list, from the reference list. Therefore, the enlargement of the reference list can be prevented.

The invention according to claim 2 is the information processing apparatus according to claim 1, wherein information indicating the transaction objects registered in the reference list among the transaction objects retrieved in response to a request from the user, and a retrieval condition specified by the user so as to retrieve the transaction objects, are stored as the reference list information in the storing means in association with each other, and the selecting means selects, as the deletion candidates, transaction objects whose retrieval condition specified for retrieval is matched with the transaction objects targeted for operation.

According to the present invention, by retrieving transaction objects in the same retrieval condition as that when transaction objects targeted for a predetermined operation are retrieved, the transaction objects registered in the reference list are selected as the deletion candidates. Therefore, it is possible to suggest the transaction objects highly probable to be unnecessary to register in the reference list. That is, it is highly probable that such transaction objects are transaction objects that have been compared as the purchase candidates in conjunction with the transaction object targeted for a predetermined operation. When the predetermined operation is performed on a certain transaction object among the plurality of transaction objects, it is probable that the comparison of the purchase candidates has been completed. The transaction object, of which the comparison has been completed, does not need to be registered in the reference list.

The invention according to claim 3 is the information processing apparatus according to claim 1 or 2, wherein the selecting means selects, as the deletion candidates, transaction objects belonging to a class identical to the transaction objects targeted for operation among a plurality of transaction object classes.

According to the present invention, since the transaction object belonging to the same class as the transaction object to be operated is selected, it is possible to suggest the transaction object highly probable to be unnecessary to register in the reference list.

The invention according to claim 4 is the information processing apparatus according to any one of claims 1 to 3, wherein in a process in which a stage where the transaction object is used is differently determined according to an attribute of the transaction object, the selecting means selects, as the deletion candidates, transaction objects used in a stage prior to a stage where the transaction object targeted for operation is used.

According to the present invention, since transaction objects used in a stage prior to a stage where the transaction object targeted for a predetermined operation is used are selected, transaction objects highly probable to be unnecessary to register in the reference list can be suggested. That is, when an operation is performed on a certain transaction object, a transaction object used in a stage prior to a stage where the transaction object is used is probable to be a transaction object of which the use has already been finished, or a transaction object unnecessary for the user. Such a transaction object does not need to be registered in the reference list.

The invention according to claim 5 is the information processing apparatus according to any one of claims 1 to 4, wherein information indicating the transaction objects registered in the reference list, and registration time periods of the transaction objects to the reference list are stored as the reference list information in the storing means in association with each other, and the selecting means selects, as the deletion candidates, transaction objects whose registration time period to the reference list is identical to the registration time period of the transaction object targeted for operation.

According to the present invention, when the transaction object targeted for a predetermined operation has been registered in the reference list, a transaction object registered at the same registration time period as that transaction object is selected. Thus, it is possible to suggest transaction objects highly probable to be unnecessary to register in the reference list. That is, when a plurality of transaction objects have been registered in the reference list at the same time period, the transaction objects may be registered as the purchase candidates targeted for comparison. When the predetermined operation has been performed on a certain transaction object among the plurality of transaction objects, it is probable that the comparison of the purchase candidates has been completed. The transaction object, of which the comparison has been completed, does not need to be registered in the reference list.

The invention according to claim 6 is the information processing apparatus according to any one of claims 1 to 5, wherein the selecting means selects, as the deletion candidates, transaction objects whose browsing time period of transaction object information is identical to the browsing time period of the transaction object targeted for operation, based on a history stored in a history storing means that stores, as a history, a browsing time period of the transaction object information associated with the transaction object by the user and information indicating the transaction object whose transaction object information has been browsed, in association with each other.

According to the present invention, since transaction objects of which the information browsing time period is the same time period as the browsing time period of the information associated with the transaction object targeted for a predetermined operation are selected, it is possible to suggest transaction objects highly probable to be unnecessary to register in the reference list. That is, when each piece of information associated with a plurality of transaction objects is browsed at the same time period, the information may be browsed for comparison as the purchase candidates. When the predetermined operation has been performed on a certain transaction object among the plurality of transaction objects, it is probable that the comparison of the purchase candidates has been completed. The transaction object, of which the comparison has been completed, does not need to be registered in the reference list.

The invention according to claim 7 is the information processing apparatus according to any one of claims 1 to 6, wherein the selecting means selects, as the deletion candidates, transaction objects whose use time period is determined to be a season prior to a season determined as a use time period of the transaction object targeted for operation.

According to the present invention, since transaction objects used in a season prior to a season where the transaction object targeted for a predetermined operation is used are selected, it is possible to suggest transaction objects highly probable to be unnecessary to register in the reference list. That is, it is highly probable that the user's necessity for such a transaction object has become low. The transaction object, of which the necessity has become low, does not need to be registered in the reference list.

The invention according to claim 8 is the information processing apparatus according to any one of claims 1 to 7, wherein the selecting means selects, as the deletion candidates, transaction objects associated with the transaction object targeted for operation among the transaction objects included in an attribute range among the transaction objects registered in the reference list, in each of a plurality of attribute ranges determined according to attributes of the transaction objects, which indicate association with the transaction object targeted for operation, and the controlling means suggests the deletion candidates selected by the selecting means in each of the attribute ranges.

When a large number of the deletion candidates is suggested, the user may feel that it is cumbersome to determine whether to delete the deletion candidates. In contrast, according to the present invention, the deletion candidates are suggested for each of attribute ranges corresponding to the association with the transaction object targeted for a predetermined operation. Therefore, among the plurality of attribute ranges, the user can select the range, in which the number of deletion candidates is convenient for the user, as the range determining whether to delete the deletion candidates. Therefore, it is easy to delete unnecessary transaction objects from the reference list.

The invention according to claim 9 is an information processing method, which is performed by an information processing apparatus, the information processing method comprising:

a selecting step of selecting, as candidates for deletion from a reference list, a transaction object associated with a transaction object targeted for operation among transaction objects registered in the reference list, based on reference list information of a user, which is stored in a storing means that stores the reference list information indicating transaction objects registered in the reference list holding a reference to information associated with the transaction objects, when a predetermined operation relating to selection of the transaction object is performed by the user; and a controlling step of suggesting the deletion candidates selected in the selecting step.

The invention according to claim 10 is an information processing program, which causes a computer included in an information processing apparatus to function as:

a selecting means that selects, as candidates for deletion from a reference list, a transaction object associated with a transaction object targeted for operation among transaction objects registered in the reference list, based on reference list information of a user, which is stored in a storing means that stores the reference list information indicating transaction objects registered in the reference list holding a reference to information associated with the transaction objects, when a predetermined operation relating to selection of the transaction object is performed by the user; and a controlling means that suggests the deletion candidates selected by the selecting means.

The invention according to claim 11 is a recording medium recording a computer-readable information processing program thereon, which causes a computer included in an information processing apparatus to function as:

a selecting means that selects, as candidates for deletion from a reference list, a transaction object associated with a transaction object targeted for operation among transaction objects registered in the reference list, based on reference list information of a user, which is stored in a storing means that stores the reference list information indicating transaction objects registered in the reference list holding a reference to information associated with the transaction objects, when a predetermined operation relating to selection of the transaction object is performed by the user; and a controlling means that suggests the deletion candidates selected by the selecting means.

Advantageous Effects of the Invention

According to the present invention, since transaction objects associated with the transaction object targeted for a predetermined operation are suggested, transaction objects highly probable to be unnecessary to register in the reference list can be suggested as the deletion candidates. Therefore, since it is easy to delete the unnecessary transaction objects from the reference list, it is possible to support appropriate deletion of transaction objects, which are unnecessary to register in the reference list, from the reference list. Therefore, the enlargement of the reference list can be prevented.

BRIEF DESCRIPTION OF THE DRAWINGS

FIG. 4A is a diagram illustrating an example of contents registered in a membership information DB 12*a*, FIG. 4B is a diagram illustrating an example of contents registered in a genre information DB 12*b*, FIG. 4C is a diagram illustrating an example of contents registered in a shop information DB 12*c*, FIG. 4D is a diagram illustrating an example of contents registered in an item information DB 12*d*, FIG. 4E is a diagram illustrating an example of contents registered in a browsing history DB 12*e*, FIG. 4F is a diagram illustrating an example of contents registered in a purchase history DB 12*f*, and FIG. 4G is a diagram illustrating an example of contents registered in a bookmark information DB 12*g*.

MODE FOR CARRYING OUT THE INVENTION

Hereinafter, embodiments of the present invention will be described in detail with reference to the drawings. Also, embodiments described below are embodiments when the present invention is applied to an electronic commerce system.

[1. Overview of Configuration and Function of Electronic Commerce System]

[1-1. Configuration of Electronic Commerce System]

Figure 1:
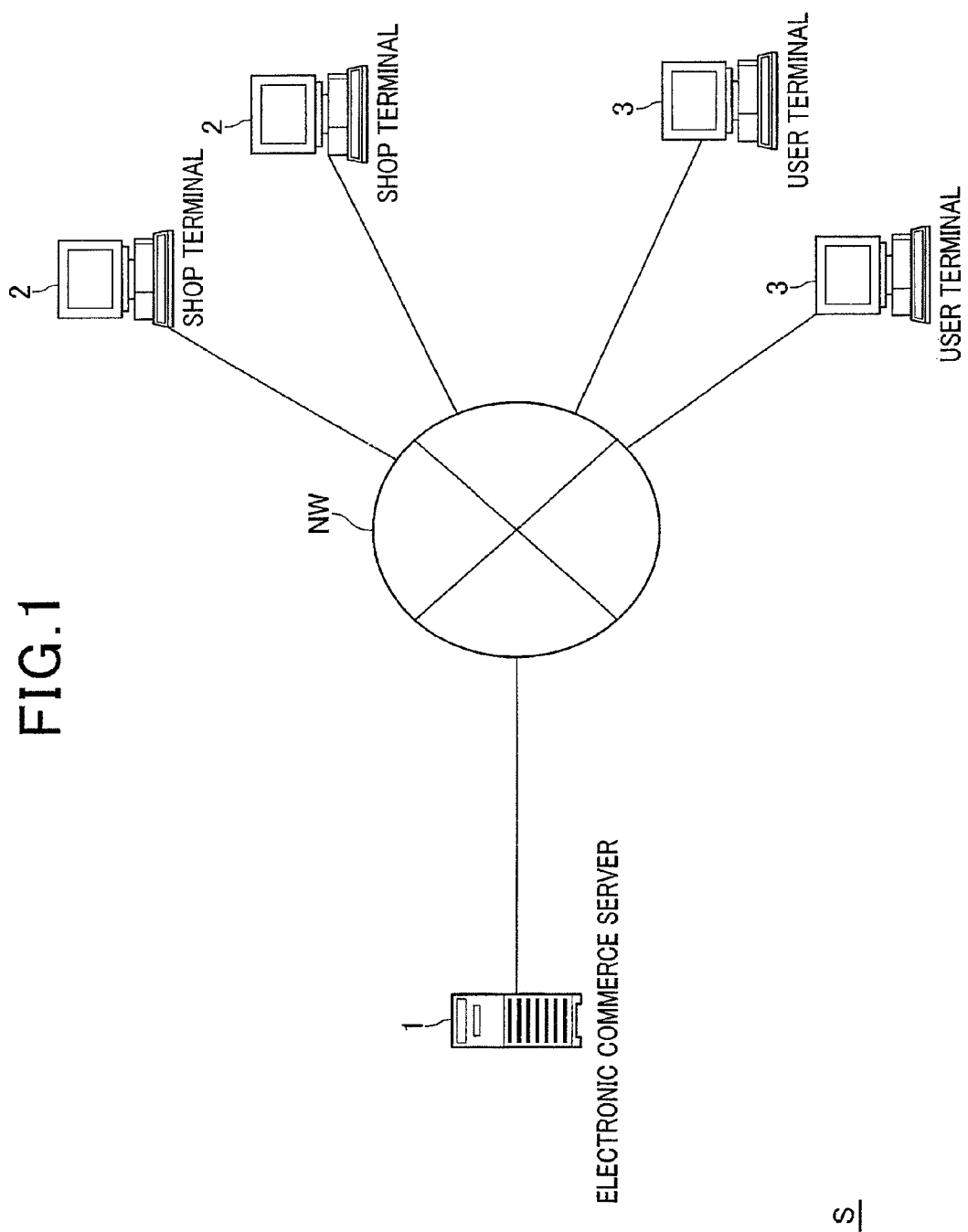
FIG. 1 is a diagram illustrating an example of a schematic configuration of an electronic commerce system S according to an embodiment.

First, a configuration of an electronic commerce system S according to the present embodiment will be described with reference to FIG. 1. FIG. 1 is a diagram illustrating an example of a schematic configuration of an electronic commerce system S according to the present embodiment.

As illustrated in FIG. 1, the electronic commerce system S is configured to include an electronic commerce server 1, a plurality of shop terminals 2, and a plurality of user terminals 3. Moreover, the electronic commerce server 1, and the respective shop terminals 2 and the respective user terminals 3 can mutually transmit and receive data through a network NW by using, for example, TCP/IP or the like as a communication protocol. Also, the network NW is constructed by, for example, Internet, a dedicated communication line (for example, community antenna television (CATV) line), a mobile communication network (including abase station and the like), a gateway, or the like.

The electronic commerce server 1 (an example of an information processing apparatus according to the present invention) is a server apparatus that performs various processes related to an online mall or an Internet auction where users can purchase items. Users can purchase desired items from desired shops by using the online mall. Also, the users can exhibit items in an auction and bid for exhibited items. The electronic commerce server 1 transmits a web page of an online mall or auction and performs processes associated with retrieving, purchasing, exhibiting, bidding, and the like of items, for example, in response to a request from the shop terminal 2 or the user terminal 3.

The shop terminal 2 is a terminal device that is used by an employee or the like of a shop opened in an online mall. The shop terminal 2 is used to, for example, register information of items for sale in the online mall and confirm contents of ordered items. Also, the shop terminal 2 accesses the electronic commerce server 1 based on an operation from an employee or the like, and receives and displays a web page from the electronic commerce server 1. Software such as a browser or an email client is incorporated into the shop terminal 2. As an example of the shop terminal 2, a personal computer or the like is used.

The user terminal 3 is a terminal device of a user who uses an online mall or an auction. The user terminal 3 accesses the electronic commerce server 1 based on an operation from the user, and receives and displays a web page from the electronic commerce server 1. Software such as a browser or an email client is incorporated into the user terminal 3. As an example of the user terminal 3, a personal computer, a personal digital assistant (PDA), a mobile information terminal such as a smartphone, a mobile phone, or the like is used.

[1-2. Suggestion of Item Candidate to be Deleted from Bookmark]

The electronic commerce system S provides a bookmark function. The bookmark function is a function of registering an item sold in an online mall as a bookmark of a user to store a reference to an item page in a user-dedicated list so that the user can easily browse the item page of the bookmarked item. The item page is a web page in which detailed information on one item is displayed. Moreover, the bookmarked item is referred to simply as a bookmark. In an online mall, a hyperlink (hereinafter referred to as a "link") displayed as "add to bookmark" is displayed in an item page. When a user selects this link, an item of which the information is displayed in the item page is registered in the bookmark of the user. The user can check the items registered in the bookmark on a bookmark page. The bookmark page is a web page in which a list of items registered in the bookmark is displayed and is a dedicated web page of each user. Moreover, a link to an item page of an item registered in the bookmark is embedded in the bookmark page. When the user selects a link to an optional item in the bookmark page, it is possible to display the corresponding item page. Moreover, the user can designate an item that does not need to be registered among the items registered in the bookmark of the bookmark page and delete the item from the bookmark.

Of the items registered in the bookmark once, there are items that are already unnecessary to register in the bookmark due to, for example, a change in a user's situation or the like. Therefore, as described above, the bookmark can be organized by deleting the items from the bookmark. However, for example, there is a case where retrieving the items unnecessary to register among the items registered in the bookmark is troublesome for the user, or the operation itself of deleting the items from the bookmark is troublesome. Therefore, the items unnecessary to register are accumulated without being deleted from the bookmark, resulting in the enlargement of the bookmark. If the bookmark is enlarged, for example, it is difficult for the user to find out an item of which detailed information is wanted to be checked in the bookmark page, and it is difficult for the user to organize the bookmark by himself or herself in the bookmark page.

Thus, the electronic commerce server 1 provides support for deleting items unnecessary to register among the items registered in the bookmark. Specifically, when an operation that is predetermined for an item by the user is performed in the online mall or the auction, the electronic commerce server 1 selects items associated with the item targeted for the predetermined operation as the candidate to be deleted from the bookmark. Then, the electronic commerce server 1 suggests the selected deletion candidate by the user terminal 3. Herein, the predetermined operation is referred to as an "item-selection related operation". The item targeted for the item-selection related operation is referred to as an "item targeted for operation" or an "operation target item".

[1-2-1. Item-Selection Related Operation]

The item-selection related operation is an operation that is predetermined in relation to the selection of the item. Specifically, the item-selection related operation is an operation performed after the user selects the item targeted for operation, or an operation accompanying the selection of the item by the user. Examples of the item-selection related operation include an operation of registering an item in the bookmark, an operation of deleting an item from the bookmark, an operation of ordering (purchasing) an item, and an operation of exhibiting an item in an auction or the like. The following describes the probable reasons why, when such an operation is performed, an item associated with an operation target item does not need to be registered in the bookmark.

(1) Registration To Bookmark

There is a case where the user registers an item in the bookmark as a purchase candidate. Herein, the item registered in the bookmark is the item targeted for operation. After that, the user registers an item associated with the item in the bookmark. In this case, for example, there is a probability that the purchase candidate will be changed from an earlier registered item to a later registered item. Therefore, the earlier registered item is an item that is not the purchase candidate. The item that is not the purchase candidate does not need to be registered in the bookmark. Also, the operation of registering the item in the bookmark is referred to as a "bookmark registration operation".

(2) Deletion from Bookmark

There is a case where the user registers a plurality of items in order for comparative examination as the purchase candidate. After that, it is assumed that the user deletes any item among these items. Herein, the item deleted from the bookmark is the item targeted for operation. In this case, for example, since the user determines items to be purchased among the items being the purchase candidates, there is a probability that it is unnecessary to perform comparison on a plurality of items. Alternatively, for example, since the user has stopped the purchase itself, there is a probability that it is unnecessary to compare a plurality of items. The item on which it is unnecessary to perform comparison does not need to be registered in the bookmark. Also, the operation of deleting the item from the bookmark is referred to as a "bookmark deletion operation".

(3) Order

For example, the user registers an item in the bookmark as a purchase candidate, and then, orders an item associated with the item. Herein, the ordered item is the item targeted for operation. In this case, for example, since the item the user has decided to actually purchase is the ordered item, there is a probability that the items registered in the bookmark will be excluded from the purchase candidate. The item that is not the purchase candidate also does not need to be registered in the bookmark. Also, the operation of ordering the item is referred to as an "order operation". An item associated with the ordered item is suggested as a deletion candidate, regardless of whether the item the user has ordered is registered in the user's bookmark.

(4) Exhibition

For example, there is a case where the user exhibits an item in an auction so as to sell an item unnecessary for the user. Herein, the exhibited item is the item targeted for operation. For example, there is a case where the user exhibits an unnecessary item by purchasing other item. For example, there is a probability that the user will not purchase an item associated with the exhibited item. The item unnecessary to purchase does not need to be registered in the bookmark. Also, the operation of exhibiting the item is referred to as an "exhibition operation". An item associated with the exhibited item is suggested as a deletion candidate, regardless of whether the item on which the user has performed the exhibition operation is registered in the user's bookmark.

Also, an administrator of the electronic commerce system S may arbitrarily determine which operation of the exemplified operations is caused to suggest the candidate to be deleted from the bookmark. Also, the electronic commerce server 1 may be configured such that the user can arbitrarily set which operation of the exemplified operations is caused to suggest the candidate to be deleted from the bookmark. Also, the operation being the item-selection related operation is not limited to the above-described operations.

[1-2-2. Item Associated with Operation Target Item]

Examples of the item associated with the item targeted for operation include an item of which the retrieval condition is matched with the operation target item, an item of which the genre is matched with the operation target item, an item used in a stage prior to the operation target item, an item registered in the bookmark at the same time period as the operation target item, an item of which the item page is browsed at the same time period as the operation target item, and an item used in a season prior to a season when the operation target item is used. The following describes the probable reasons why, when the item-selection related operation is performed, such an item does not need to be registered in the bookmark.

(1) Item Whose Retrieval Condition is Matched with Operation Target Item

The user can designate a retrieval condition so as to search for an item being a purchase candidate in the online mall. As an example of the retrieval condition, a keyword, an item genre, and the like can be designated. When the retrieval condition is designated, an item satisfying the retrieval condition is retrieved by the electronic commerce server 1. Then, a retrieval result page is displayed on the user terminal 3. The retrieval result page is a web page on which a list of retrieved items is displayed. When the user selects any item among the items displayed on the retrieval result page, an item page of the selected item is displayed. Herein, when the user decides the selected item as a purchase candidate, the item is registered in the bookmark. Thus, the user can, if necessary, register the item being the purchase candidate in the bookmark, among the items retrieved under the designated retrieval condition. It is considered that the plurality of items retrieved under the same retrieval condition has a certain relation, for example, the plurality of items retrieved under the same retrieval condition is items matched with the same keyword or items belonging to the same genre. Also, a plurality of items that has been retrieved at different timings but has been retrieved under the same retrieval condition is also the mutually related items. The user decides the item to be purchased by comparing the plurality of items as the purchase candidate. Thus, when the registration in the bookmark, the deletion from the bookmark, the purchase, or the exhibition is performed on the items retrieved under the retrieval condition designated by the user, there is a probability that the item, of which the retrieval condition designated at the time of retrieval among the items registered in the bookmark is matched with the retrieval condition of the item targeted for operation, will not be the purchase candidate. Therefore, such an item is a deletion candidate because it does not need to be registered in the bookmark.

Also, there is a case where the user designates a plurality of retrieval conditions. For example, a keyword and a genre are designated, or a plurality of keywords is designated. In this case, only an item targeted for the item-selection related operation and an item matched with all retrieval conditions may be suggested as the deletion candidate, and items matching at least one retrieval condition may be suggested as the deletion candidate.

(2) Item Whose Genre is Matched with Operation Target Item

The items each are classified by a certain item genre. The genre (an example of a class according to the present invention) of items is a range to which items of the same type, property, use, or the like belong when items are classified by their types, properties, uses, or the like, for example.

Genres of items are defined hierarchically by a tree structure. Specifically, each node of a tree structure corresponds to a genre. The depth of a node corresponds to the level (class) of the genre corresponding to the node. The depth of a node is a distance from a node (hereinafter referred to as a "root node") positioned at the root. As the level value is larger, the level depth becomes deeper, and as the level value is smaller, the level depth becomes shallower. A genre corresponding to a child node of the root node is a genre of level 1. The genre of level 1 is the highest genre.

A genre corresponding to a child node among the genres of level 1 is defined as a genre of level 2. Herein, a genre C2 corresponding to a child node of a certain genre C1 is referred to as a "child genre" of the genre C1. A child genre is also referred to as a sub-genre. Moreover, the genre C1 at this time is referred to a "parent genre" of the genre C2. The child genre is a range to which the same items belong when the parent genre is further classified into a plurality of genres. Thus, the child genre belongs to a parent genre. Moreover, a genre corresponding to a descendant node of a certain genre is referred to a "descendant genre". For example, it is assumed that genre C3 is a child genre of the genre C2. In this case, the genres C2 and C3 are descendant genres of the genre C1. Moreover, a genre corresponding to an ancestor node of a certain genre is referred to as an "ancestor genre". The genres C1 and C2 are ancestor genres of the genre C3.

A plurality of items belonging to the same genre is mutually related items. Thus, when the registration in the bookmark, the deletion from the bookmark, the purchase, or the exhibition is performed on a certain item, there is a probability that the item belonging to the same genre as the item will be an item that does not need to be registered in the bookmark.

Basically, each item is assigned with a genre defined to the lowest level (genre corresponding to a leaf node in a tree structure). That is, the genre of each item is divided into the most sub-divided genres. Thus, there is a case where the range of the related items is narrowed if the related items are determined according to whether the lowest-level genres where each item is classified are identical to each other. In this case, for example, there is a case an item targeted for the user's actual comparison as a purchase candidate together with the item targeted for pre-operation is not suggested as a deletion candidate. For example, as a genre of a level 4, there is "seasonal household appliance". Also, as a child genre of the seasonal household appliance", there are an "electric fan" and a "cold air blower", and the "electric fan" and the "cold air blower" are said to be in the lowest-level genres. When the user has registered the item in the bookmark when trying to purchase either the electric fan or the cold air blower so as to cool himself or herself, the item of the electric fan and the item of the cold air blower are registered in the bookmark. Herein, when the item-selection related operation is performed on the item of the electric fan, the genre of each item is the "electric fan" or the "cold air blower", and thus, the item of the electric fan among the items registered in the bookmark is suggested as the deletion candidate, but the item of the cold air blower is not suggested.

Thus, the related item may be determined in the genre that is more than one higher than the lowest-level genre where the items are classified, that is, the parent genre. For example, in the above example, if whether the items belong to the same genres is determined by the genre of the level 4 to which the operation target item belongs and the genre of the level 4 to which the item registered in the bookmark belongs, the item of the electric fan and the item of the cold air blower also belong to the "seasonal household appliance". Thus, when the item-selection related operation is performed on the item of the electric fan, the item of the electric fan and the item of the cold air item are suggested as the deletion candidate.

The level of the genre at which the determination as to whether the items belong to the same genres is performed, for example, may be previously commonly determined in all genres, or may be determined according to the genre to which the operation target item belongs. For example, the electronic commerce server 1 may perform the determination based on the number of items belonging to the respective genres from the genre of the level 1, to which the operation target item belongs, to the genre of the lowest level, among all items being sold in the online mall. Specifically, the electronic commerce server 1, for example, may determine whether the items belong to the same genre by the genre of the level at which the number of items is closest to a preset number, among the respective genres from the level 1 to the lowest level. Also, for example, the electronic commerce server 1 may perform the determination based on the number of items belonging to the respective genres from the genre of the level 1, to which the operation target item belongs, to the genre of the lowest level, among all items registered in the bookmark by the user. Specifically, the electronic commerce server 1, for example, may determine whether the items belong to the same genre by the genre of the level at which the number of items registered in the bookmark is closest to a preset number, among the respective genres from the level 1 to the lowest level.

(3) During Certain Process, Item Used in Stage Prior to Operation Target Item

In an item group of a certain genre, there is a case where a stage used is different according to an attribute an item during a process of an object determined according to the genre. Examples of this process include a process where a user grows (growth process), a process where a user is skillful in, is proficient in, and improves an object associated with the item, and a story progress process. When the user enters a certain stage during a certain process, it is common that an item used in a stage prior to that stage is an item that is no longer required for the user, or an item that is already used. The item that is not required for the user does not need to be registered in the bookmark. The item the user has already used is an item unnecessary to purchase, and thus, does not need to be registered in the bookmark. Thus, when a certain item is targeted for operation, an item used in a stage prior to a stage where that item is used is a deletion candidate as an item associated with the operation target item.

For example, it is assumed that there are an item A, which is used in a stage a, and an item B, which is used in a stage b. Herein, the stage a is a stage prior to the stage b. Also, for example, it is assumed that the item A is registered in the bookmark as the purchase candidate. In this state, when the user registers the item B in the bookmark as the purchase candidate, it is considered that the user has an intention to purchase the item used in the stage b. Therefore, there is a probability that the item. A used in the stage a is an item unnecessary for the user to purchase. Also, when the user deletes the item B from the bookmark, it is considered that the user has purchased the item used in the stage b (a case where that item is the item B is included) or the item used in a stage after the stage b. The item the user has purchased is an item the user will use from now on. Therefore, there is a probability that the item A used in the stage prior to the stage where the item the user has purchased is used is an item unnecessary for the user to purchase. Also, the same is applied to a case where the user has purchased the item B. Also, when the user exhibits the item B, the user enters a stage after the stage b, and therefore, there is a probability that the item B is an item unnecessary for the user. Therefore, there is a probability that the item A is an item unnecessary for the user to purchase. A specific example will be described below.

There is a case where books such as reference books or workbooks for ability testing that measures certain ability by a score are published according to target scores. As examples of such books, there are books for 600 points, 700 points, 800 points, and 900 points. In this case, a process showing an improvement of a user's ability is applied. Herein, when the user has started to use the book for 800 point, it is considered that the user has entered a stage aiming at 800 points. In this case, there is a probability that the books for 600 points and 700 points as used in the prior stages are unnecessary for the user.

Shoes have respective sizes. The size corresponds to a length of feet. In this case, a user's growth process is applied. In the user's growth process, the length of the user's feet becomes longer, and it is unusual that the length of the feet becomes shorter. Thus, for example, when the length of the user's feet is 20 cm, there is a probability that shoes to wear in a stage where the length of the user's feet is less than 20 cm, that is, shoes having a size of less than 20 cm, are unnecessary for the user.

There is a case where golf clubs are sold based on the degree of golfing ability. For example, there are golf clubs for beginners, intermediates, and seniors. In this case, a process for improvement of golfing is applied. In the process for improvement of golfing, the user is a beginner in the first stage. Thus, as the golfing improves, the user becomes an intermediate and then becomes a senior. It is not highly probable that the user who has become the intermediate will be returned to the beginner. Therefore, it is probable that the user who has become the intermediate does not need golf clubs for beginners.

Volume numbers are assigned to a group of serial books, respectively. In this case, a story progress process is applied. It is common that such a book group is read in order from the book of volume 1 due to the story progress. Therefore, when the user starts to read a book of a certain volume number, there is a probability that the user has already read books of earlier volume numbers than that volume number. Therefore, since the user does not need to purchase such books, it is unnecessary to register such books in the bookmark.

(4) Item Registered in Bookmark at Same Time Period as Operation Target Item

In the process where the user determines the item to be purchased, it is considered that the user sets a plurality of items as the purchase candidates and determines the item to be purchased by comparing the items. Therefore, a plurality of items is registered as the purchase candidates in the bookmark at the same time period. The plurality of items registered in the bookmark at the same time period is the mutually related items, in that the items are compared as the purchase candidates. Therefore, when a certain item is deleted from the bookmark or is purchased, there is a probability that an item registered in the bookmark at the same time period as that item is not the purchase candidate. Therefore, such an item does not need to be registered in the bookmark.

(5) Item Whose Item Page is Browsed at Same Time Period as Operation Target Item When a plurality of items is compared and examined in the process where the user determines the item to be purchased, it is considered that the comparison is performed based on information posted on each item page. Therefore, the item pages of the plurality of items being the purchase candidates may be browsed at the same time period. The plurality of items of which item pages are browsed at the same time period is the mutually related items in that the items are compared as the purchase candidates. Therefore, when a certain item is deleted from the bookmark or is purchased, there is a probability that an item of which the item page is browsed at the same time period as the period that the item page of that item is browed is not the purchase candidate. Therefore, such items do not need to be registered in the bookmark.

(6) Item Used in Season Prior to Season when Operation Target Item is Used

Among items, there are items called seasonal items. The seasonal items are items used in particular seasons. Herein, the seasons are not limited to, for example, those defined by dividing a year into spring, summer, autumn, and winter according to weather. For example, a time period when a certain event is popularly done in one year, such as an examination season or an employment season, is included. When it enters a certain season, seasonal items of that season are actively used, but seasonal items of seasons prior to that season are not used much. In this regard, it is considered that there is a relation between items that are used in different seasons. Therefore, when a certain item is deleted from the bookmark or is purchased, there is a probability that an item used in a season prior to a season when that item is used is less necessary for the user. The item that is less necessary for the user does not need to be registered in the bookmark. Herein, for example, a season prior to a certain season may be a season just before the certain season, or may be a season ranged from the certain season to six months ago.

Also, the administrator of the electronic commerce system S may arbitrarily determine the criteria to select the related item among the criteria described in sections (1) to (6). Also, when a certain item-selection related operation is performed, the administrator may arbitrarily determine the criteria to select the related item. Also, the administrator may configure the electronic commerce server 1 to select the related item by combining the criteria (1) to (6). For example, items registered in the bookmark at the same time period as the item targeted for operation, among items of the same genre as the item targeted for operation, may be the related items. Also, for example, items of which the item pages have been browsed at the same time period as the item page of the item targeted for operation, among items registered in the bookmark at the same time period as the item targeted for operation, may be the related items. Also, the item associated with the item targeted for operation is not limited to the item described in sections (1) to (6). For example, the item whose shop of a distribution source is the same as the item targeted for operation may be the related item. Also, for example, an option item when the item targeted for operation is a main item, or a main item when the item targeted for operation is an option item may be the related item. Examples of the option item include consumables of a replacement brush head or the like with respect to an electric toothbrush being a main item, and accessories of a case accommodating a mobile personal computer with respect to the mobile personal computer being a main item. Information indicating a relation between the main item and the option item may be, for example, stored in the storage unit 12. Also, for example, when an item code of the main item is posted on an item page of the option item or the like, that is, when an item code of the main item is included in item information of the option item or the like, the related item can be specified from the item information.

[1-2-3. Suggestion of Deletion Candidate]

Figure 2:
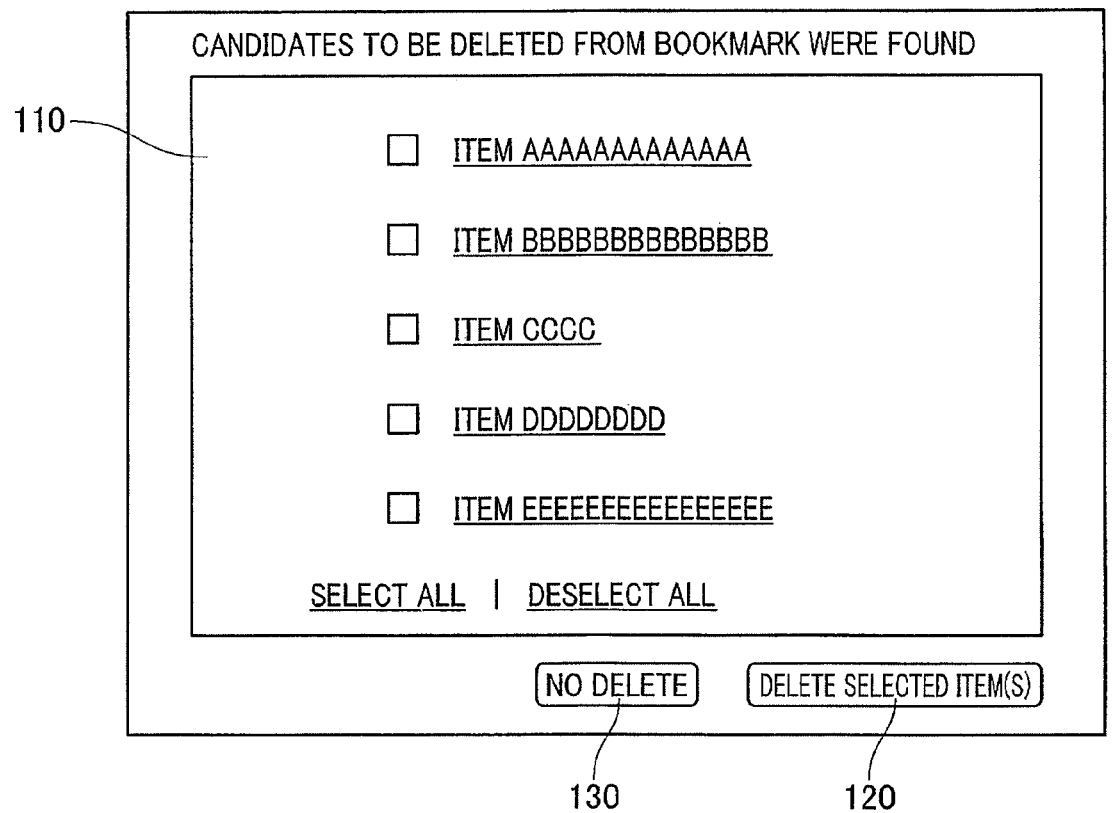
FIG. 2 is a diagram illustrating a screen display example of a deletion candidate page.

FIG. 2 is a diagram illustrating a screen display example of a deletion candidate page. When the registration of the item in the bookmark, the deletion of the item from the bookmark, the purchase of the item, or the exhibition of the item is done by the item-selection related operation performed by the user, the deletion candidate page illustrated in FIG. 2 is displayed on the screen of the user terminal 3. The deletion candidate page is a web page on which the item selected as the candidate to be deleted from the bookmark is suggested. Thus, the deletion candidate page is a web page that provides support for deleting items, which are unnecessary to register in the bookmark among the deletion candidates, from the bookmark.

As illustrated in FIG. 2, a deletion candidate region 110, a delete button 120, a no delete button 130, and the like are displayed on the deletion candidate page. A list of items being the deletion candidates is displayed in the deletion candidate region 110. Specifically, item names of the deletion candidates are displayed in the deletion candidate region 110. The item name is text-linked to the item page of the item being the deletion candidate. The user can confirm the information of the item being the deletion candidate by selecting the item name. Also, a check box for selecting whether to delete a corresponding item from the bookmark with respect to each item name is displayed in the deletion candidate region 110. Also, links for making all check boxes of items be a selected state or an unselected state are displayed in the deletion candidate region 110. Also, for example, an image of the item being the deletion candidate, a registration date of the item being the deletion candidate in the bookmark, and the like may also be displayed in the deletion candidate region 110.

When the user selects the unnecessary items from the deletion candidates and selects the delete button 120, the selected items are deleted from the user's bookmark. On the other hand, when the user selects the no delete button 130, the deletion of the item from the bookmark is not performed, and a next web page is displayed according to the item-selection related operation performed by the user.

Therefore, among the items registered in the bookmark by the user, the items associated with the operation target item are suggested as deletion candidates. That is, the items that may not need to be registered in the bookmark are suggested. Thus, the user can easily find out items that do not need to be actually registered in the bookmark among the suggested items. Therefore, the user can easily delete the items that do not need to be registered in the bookmark. This reduces a ratio of the items that do not need to be registered in the bookmark, with respect to all the items registered in the bookmark. Therefore, the enlargement due to the items unnecessary to register in the bookmark is prevented, and the bookmark are appropriately organized.

Also, the items selected as the deletion candidates may be suggested to the user by methods other than the displaying of the web page. For example, the electronic commerce server 1 may be configured such that a pop-up window including the same display content as the display content illustrated in FIG. 2 is displayed by the user terminal 3. Also, for example, the electronic commerce server 1 may create an email including a list of items selected as the deletion candidates as a body, and transmit the created email to the user performing the item-selection related operation. In this case, the user terminal 3 receives the email and displays the received email on a screen, based on the user's operation. In the body of the email, for example, the item name or the like of the item as the deletion candidate is described for each line. The user replies to the received email. In this case, the user displays a creation screen of an email to reply (hereinafter, referred to as "reply email), so as to quote the body of the received email. Then, the user adds a character (for example, "delete", "x", or the like), to the effect of deletion, to a line where the item name or the like of the item to be deleted from the bookmark is described in the body of the reply email. Thus, the user terminal 3 performs the transmit operation, so that the reply email is transmitted from the user terminal 3 to the electronic commerce server 1. The electronic commerce server 1 deletes the items from the bookmark, based on the body of the received reply email.

[2. Configuration of Electronic Commerce Server]

Next, the configuration of the electronic commerce server 1 will be described with reference to FIGS. 3 and 4.

Figure 3:
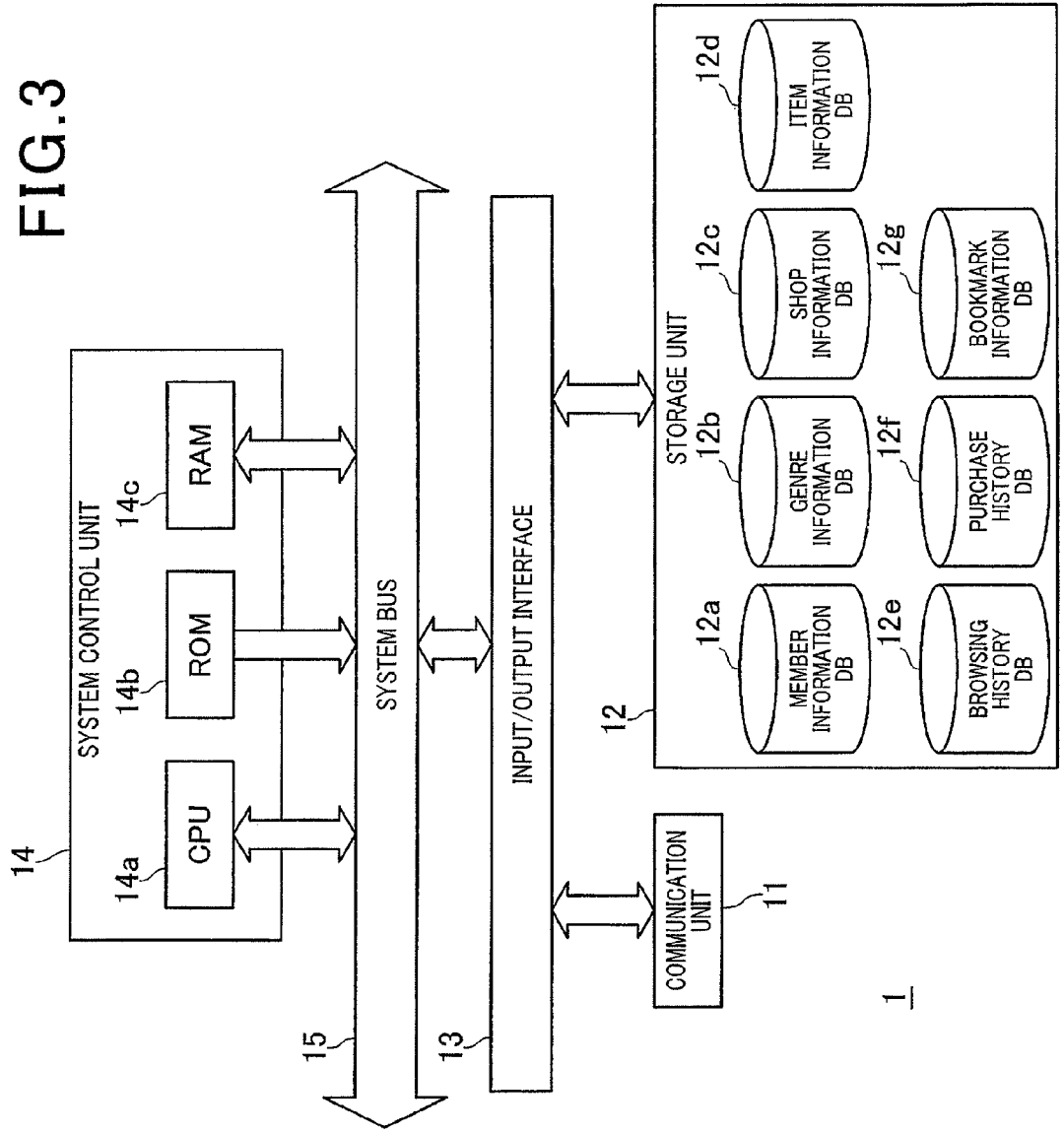
FIG. 3 is a block diagram illustrating an example of a schematic configuration of an electronic commerce server 1 according to an embodiment.

FIG. 3 is a block diagram illustrating an example of a schematic configuration of the electronic commerce server 1 according to the present embodiment. As illustrated in FIG. 3, the electronic commerce server 1 includes a communication unit 11, a storage unit 12, an input/output interface 13, and a system control unit 14. The system control unit 14 and the input/output interface 13 are connected through a system bus 15.

The communication unit 11 is connected to a network NW to control communication states of the shop terminals 2, the user terminals 3, and the like.

The storage unit 12 (an example of a storing means and a history storing means according to the present invention) is configured by, for example, a hard disk drive or the like. Databases such as a membership information DB (database) 12a, a genre information DB 12b, a shop information DB 12c, an item information DB 12d, a browsing history DB 12e, a purchase history DB 12f, a bookmark information DB 12g, and the like are constructed in the storage unit 12.

FIG. 4A is a diagram illustrating an example of contents registered in the membership information DB 12a. Membership information of users registered in the electronic commerce system S as members is registered in the membership information DB 12a. Specifically, attributes of a user such as a user ID, a password, a nickname, a name, a date of birth, a gender, a zip code, an address, a telephone number, and an email address are registered in the membership information DB 12a in association with each user. The user ID is identification information of a user.

FIG. 4B is a diagram illustrating an example of contents registered in the genre information DB 12b. Genre information on the genre of an item is registered in the genre information DB 12b. Specifically, attributes of a genre such as a genre ID, a genre name, a genre level, a parent genre ID, a child genre ID list, and use season information are registered in the genre information DB 12b in association with each genre. The genre information is set by, for example, an administrator or the like of an online mall. The genre ID is identification information of a genre defined by genre information. A parent genre ID is a genre ID of a parent genre of a genre defined by genre information. A child genre ID list is a list of genre IDs of child genres of a genre defined by genre information. The child genre ID list is set when a genre defined by genre information has a child genre. The use season information is information indicating a season where the item of the genre defined by the genre information is expected to be frequently used. The use season information is set when the item is a seasonal item. For example, the genre information may be information indicating spring, summer, autumn, and winter, or may be information indicating a time period from a start date of the season to an end date of the season.

FIG. 4C is a diagram illustrating an example of contents registered in the shop information DB 12c. Shop information on a shop that is open at an online mall is registered in the shop information DB 12c. Specifically, attributes of a shop such as a shop ID, a shop name, a zip code, an address, a telephone number, an email address, and trading genre information are registered in the shop information DB 12c in association with each shop. The shop ID is identification information of a shop. The trading genre information is information indicating a genre of items traded by a shop is trading (items sold in a shop). Specifically, a genre ID of each genre of items traded by a shop is set in the trading genre information.

FIG. 4D is a diagram illustrating an example of contents registered in the item information DB 12d. Item information on items sold in an online mall is registered in the item information DB 12d. Specifically, attributes of an item such as an item ID, a shop ID, an item code, a genre ID, an item name, a uniform resource locator (URL) of an item image, an item description, and an item price are registered in the item information DB 12d in association with each item. The item ID (an example of information indicating the transaction object according to the present invention) is identification information of an item for allowing a shop or the like to manage items to be sold. The shop ID indicates a shop which is a distribution source of an item. The item code is a code number for identifying an item. The item code is, for example, a Japanese article number code (JAN) code and the like. The genre ID is an ID of a genre to which an item belongs.

FIG. 4E is a diagram illustrating an example of contents registered in the browsing history DB 12e. A browsing history of an item page of an online mall is registered in the browsing history DB 12e. Specifically, an item ID, a browsing date and time, and a user ID are registered in the browsing history DB 12e in association whenever an item page was browsed. The item ID indicates an item of which the item page was browsed. The browsing date and time (an example of the browsing time period according to the present invention) indicates the date and time when an item page was browsed. Specifically, the browsing date and time is the date and time when the electronic commerce server 1 transmitted an item page to the user terminal 3. The user ID indicates a user who browsed an item page.

FIG. 4F is a diagram illustrating an example of contents registered in the purchase history DB 12f. A purchase history of items purchased by a user is registered in the purchase history DB 12f. Specifically, an order code, a purchase date and time, a user ID, an item ID, a shop ID, an item code, the number of purchases, and the like are registered in the purchase history DB 12f in association with each purchase of items. The order code is identification information of an order assigned whenever an item is ordered. The user ID indicates a user who purchased an item. The item ID and the item code indicate an item which has been purchased. The shop ID indicates a shop which is a purchase destination. The number of purchases is the number of items which have been purchased.

FIG. 4G is a diagram illustrating an example of contents registered in the bookmark information DB 12g. Bookmark information (an example of reference list information according to the present invention) on the bookmark of a user is registered in the bookmark information DB 12g. Specifically, a user ID, an item ID, a registration date and time, a retrieval condition, and the like are registered in the bookmark information DB 12g in association whenever an item is registered in a bookmark. The user ID indicates a user who has registered an item in a bookmark. The item ID indicates an item registered in a bookmark. Moreover, the item ID is information corresponding to a reference to an item page of the item registered in the bookmark. Although the information of an actual reference to the item page is a URL, the URL of the item page can be specified from the item ID. The URL of the item page may be registered in the bookmark information DB 12g together with the item ID or in place of the item ID. The registration date and time (an example of the registration time period according to the present invention) indicates the date and time when an item was registered in the bookmark. The retrieval condition is a condition designated by the user so as to retrieve the items registered in the bookmark.

Also, databases, for example, an order DB in which order contents in the online mall are registered, an auction DB in which information on auction is registered, and a catalog DB in which information on items for each item code (for example, an official name of an item, a genre ID of a genre of the item, or specifications of the item) is registered are also constructed in the storage unit 12.

Next, other pieces of information stored in the storage unit 12 will be described. Various types of data such as a hypertext markup language (HTML) document, an extensible markup language (XML) document, image data, text data, and an electronic document for displaying a web page are stored in the storage unit 12. Moreover, various setting values set by an administrator or the like are stored in the storage unit 12.

Moreover, various programs such as an operating system, a world wide web (WWW) server program, a database management system (DBMS), and an electronic commerce management program are stored in the storage unit 12. The electronic commerce management program is a program for executing various processes associated with electronic commerce. The programs may be acquired from another server apparatus through the network NW or may be recorded in a recording medium such as a digital versatile disc (DVD) and read by a drive device.

The input/output interface 13 is configured to perform interfacing processes between the communication unit 11 and the storage unit 12, and the system control unit 14.

The system control unit 14 is configured to include a CPU 14a, a read only memory (ROM) 14b, and a random access memory (RAM) 14c. The system control unit 14 is configured to function as a selecting means and a controlling means according to the present invention, when the CPU 14a reads and executes various programs.

Also, the electronic commerce server 1 may be configured as a plurality of server apparatuses. For example, a server apparatus that performs processes associated with a bookmark, a server apparatus that performs processes associated with retrieving, ordering, and the like of items in an online mall, a server apparatus that performs processes associated with an auction, a server apparatus that transmits a web page in response to a request from the user terminal 3, a server apparatus that manages databases, and the like may be connected to each other by a LAN or the like.

[3. Operation of Electronic Commerce System]

Next, the operation of the electronic commerce system S will be described with reference to FIGS. 5 to 11.

[3-1. Process Associated with Item-Selection Related Operation]

First, a process executed by the electronic commerce server 1 when the user performs the item-selection related operation will be described. Also, a process when a bookmark registration operation is performed will be described below with reference to FIG. 5, and a process when other item-selection related operation is performed will be briefly described.

[3-1-1. Case of Bookmark Registration Operation]

For example, it is assumed that a user logs in to the electronic commerce system S in advance. The system control unit 14 receives a user ID from the user terminal 3 upon the login of the user, and stores the received user ID in the user terminal 3 as a cookie. Therefore, when the user logs in, the cookie including the user ID is added to a request that is to be transmitted from the user terminal 3 to the electronic commerce server 1. Also, the user ID included in the cookie added to the request the electronic commerce server 1 receives is referred to as "requesting user ID". Also, the user indicated by the requesting user ID is referred to as "requesting user".

The user designates a retrieval condition for retrieving items in the web page of the online mall. Then, the user terminal 3 transmits the retrieval request including the designated retrieval condition to the electronic commerce server 1. The system control unit 14 holds the retrieval condition, which is included in the received retrieval request, in association with the requesting user ID. Also, the system control unit 14 retrieves items satisfying the retrieval condition included in the received retrieval request. Specifically, when a keyword is set as the retrieval condition, the system control unit 14 retrieves items including the keyword in at least one of an item name and an item description. Also, when a genre ID is set as the retrieval condition, the system control unit 14 retrieves items belonging to a genre corresponding to the genre ID. When a plurality of retrieval conditions is set, the system control unit 14 retrieves an item satisfying the plurality of retrieval conditions.

When retrieving the items, the system control unit 14 transmits a retrieve result page, on which a list of the retrieved items is displayed, to the user terminal 3. When the user selects a certain item from the retrieval result page displayed by the user terminal 3, the user terminal 3 transmits a request for an item page of the selected item to the electronic commerce server 1, and the electronic commerce server 1 transmits the corresponding item page to the user terminal 3. When the user selects a link displayed as "add to bookmark" on the item page displayed by the user terminal 3, the user terminal 3 transmits a bookmark registration request to the electronic commerce server 1. The bookmark registration request is a message requesting to register an item, of which information is displayed on the item page, to the bookmark. In the bookmark registration request, an item ID of an item to be registered to the bookmark is set. The item ID is an item ID of an operation target item.

Figure 5:
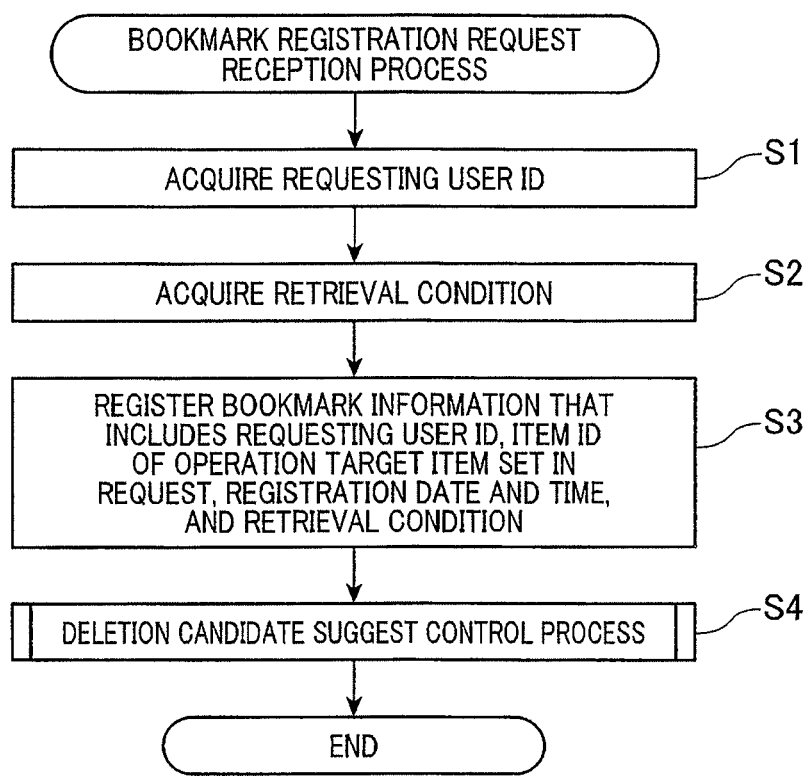
FIG. 5 is a flowchart illustrating a processing example of a bookmark registration request reception process of a system control unit 14 of the electronic commerce server 1 according to an embodiment.

FIG. 5 is a flowchart illustrating a processing example of a bookmark registration request reception process of the control unit 14 of the electronic commerce server 1 according to the embodiment. The bookmark registration request reception process is started when the electronic commerce server 1 receives the bookmark registration request from the user terminal 3.

First, the system control unit 14 acquires the requesting user ID from the received bookmark registration request (step S1). Subsequently, the system control unit 14 acquires the retrieval condition held in association with the requesting user ID (step S2). Subsequently, the system control unit 14 acquires the current date and time as registration date and time. Then, the system control unit 14 registers the requesting user ID, the item ID of the operation target item, which is set in the bookmark registration request, the registration date and time, and the retrieval condition to the bookmark information DB 12*g* in association with each other (step S3). Subsequently, the system control unit 14 performs a deletion candidate suggest control process (step S4). The deletion candidate suggest control process selects items, which are associated with the operation target item among the user's bookmark, as the deletion candidates, and the deletion candidate page, on which the selected deletion candidates are displayed, is transmitted to the user terminal 3. Also, details of the deletion candidate suggest control process will be described below. When the deletion candidate suggest control process is completed, the system control unit 14 ends the bookmark registration request reception process.

[3-1-2. Case of Bookmark Deletion Operation]

On the bookmark page, the user selects a certain item of the items registered in the bookmark as an item to be deleted from the bookmark, and selects a button displayed as "delete". Then, the user terminal 3 transmits the bookmark deletion request, which includes the item ID of the selected item as the item ID of the operation target item, to the electronic commerce server 1. When receiving the bookmark deletion request, the system control unit 14 performs the deletion candidate suggest control process. After performing the deletion candidate suggest control process, the system control unit 14 deletes bookmark information, which includes the requesting user ID and the item ID of the operation target item, from the bookmark information DB 12*g*.

[3-1-3. Case of Order Operation]

When the user performs the operation for ordering the item on the item page, the user terminal 3 displays the web page for inputting and confirming order contents. Then, when the user performs the operation of determining the order, an order request including the item ID of the ordered item as the item ID of the operation target item is transmitted to the electronic commerce server 1. When receiving the order request, the system control unit 14 performs a process necessary for the order. For example, the system control unit 14 registers the order contents to the order DB, performs a process for notifying the order contents to the shop, or registers the purchase history to the purchase history DB 12*f*. Then, the system control unit 14 performs the deletion candidate suggest control process.

[3-1-4. Case of Exhibition Operation]

On an auction web page, a user performs an operation of exhibiting an item. For example, the user sets an item name of the item to be exhibited, an item description, an item genre, and other information necessary for exhibition, and selects a button displayed as "exhibit". Then, the user terminal 3 transmits an exhibition request including the set information to the electronic commerce server 1. When receiving the exhibition request, the system control unit 14 performs a process necessary for the exhibition. For example, the system control unit 14 registers the information regarding the auction to the auction DB, and generates an auction page. The auction page is a web page on which detailed information regarding the auction of the exhibited item is displayed. The user can perform an operation of bidding for the item on the auction page. Also, the system control unit 14 specifies the exhibited item as the operation target item. For example, the system control unit 14 specifies the item code of the exhibited item from the item name or genre of the exhibited item. When the process necessary for the exhibition is completed, the system control unit 14 performs the deletion candidate suggest control process.

[3-2. Deletion Candidate Suggest Control Process]

Next, the deletion candidate suggest control process will be described with reference to FIGS. 6 to 11. The contents of the deletion candidate suggest control process are partially different according to the criteria for selecting the items associated with the operation target item. Therefore, the criteria for selecting the associated items will be described below. Also, the deletion candidate suggest control process, which is to be described below, is a process corresponding to an operation capable of specifying the item. ID of the operation target item (the bookmark registration operation, the bookmark deletion operation, or the order operation). Therefore, appropriate supplement is achieved in the process in the case where the exhibition operation is performed.

[3-2-1. Item Whose Retrieval Condition is Matched with Operation Target Item]

Figure 6:
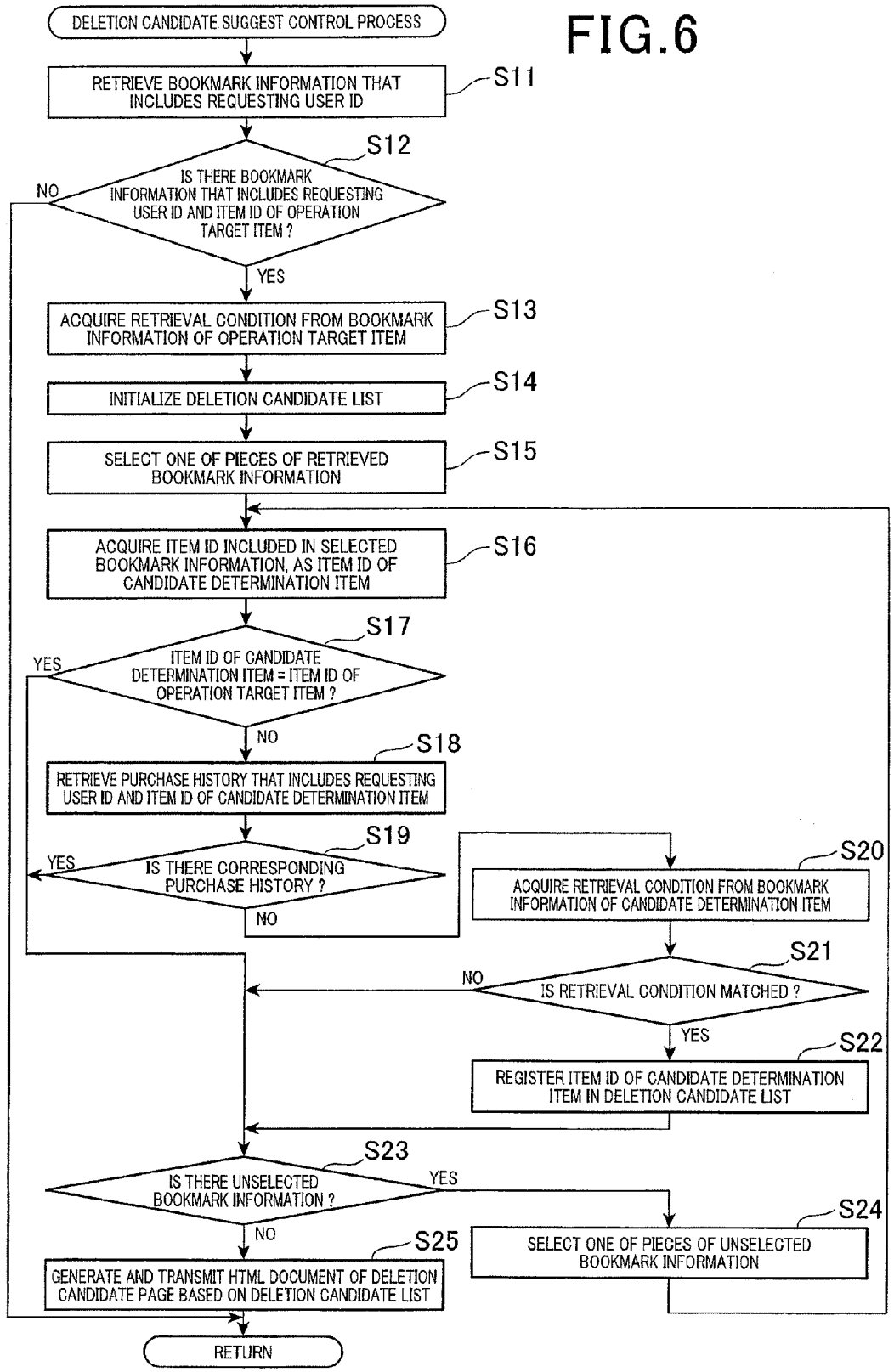
FIG. 6 is a flowchart illustrating a processing example of a deletion candidate suggest control process of the system control unit 14 of the electronic commerce server 1 when an item whose retrieval condition is matched with an operation target item is an item associated with the operation target item.

FIG. 6 is a flowchart illustrating a processing example of the deletion candidate suggest control process of the system control unit 14 of the electronic commerce server 1 when an item of which the retrieval condition is matched with an operation target item is an item associated with the operation target item.

First, the system control unit 14 retrieves bookmark information including the requesting user ID from the bookmark information DB 12g (step S11). Subsequently, the system control unit 14 determines whether there is the bookmark information including the requesting user ID and the item ID of the operation target item (hereinafter, referred to as "bookmark information of the operation target item" in the retrieved bookmark information (step S12). That is, the system control unit 14 determines whether the operation target item is registered in the bookmark of the requesting user's bookmark. In this case, when it is determined that there is not the bookmark information of the operation target item (NO in the step S12), the system control unit 14 ends the deletion candidate suggest control process. In this case, the deletion candidate page is not transmitted to the user terminal 3.

On the other hand, when it is determined that there is the bookmark information of the operation target item (YES in the step S12), the system control unit 14 acquires the retrieval condition from the bookmark information of the operation target item (step S13). Subsequently, the system control unit 14 initializes the deletion candidate list (step S14). The deletion candidate list is a list in which item IDs of items selected as the deletion candidates are registered.

Subsequently, the system control unit 14 selects one of pieces of the bookmark information retrieved in the step S11 (step S15). Subsequently, the system control unit 14 acquires the item ID included in the selected bookmark information as the item ID of the candidate determination item targeted for the determination of the deletion candidate (step S16). Subsequently, the system control unit 14 determines whether the item ID of the operation target item is matched with the item ID of the candidate determination item (step S17). In this case, when it is determined as matched (YES in the step S17), the system control unit 14 proceeds to step S23. In this case, the candidate determination item is excluded from the deletion candidates. That is, the item itself to be operated is excluded from the deletion candidates. Also, when the item-selection related operation is the order operation or the exhibition operation, the system control unit 14 may also include the item itself to be operated in the deletion candidates.

On the other hand, when it is determined as not matched (NO in the step S17), the system control unit 14 retrieves the purchase history, which includes the requesting user ID and the item ID of the operation target item, from the purchase history DB 12f (step S18). Subsequently, the system control unit 14 determines whether there is the corresponding purchase history (step S19). That is, the system control unit 14 determines whether the requesting user has purchased the operation target item. In this case, when it is determined that there is the corresponding purchase history (YES in the step S19), the system control unit 14 proceeds to step S23. That is, the item the user has purchased is excluded from the deletion candidates. For example, regarding the items of genres of groceries or consumables, there is a case where the user repurchases the item having been purchased once. Since the item having been purchased more than once is registered in the bookmark, it is easy to access the item page for purchasing that item is facilitated, and it is unnecessary to retrieve it again. Therefore, since the item having been purchased once may be repurchased, it is excluded from the deletion candidates. Also, the system control unit 14 may also include the item having been purchased in the deletion candidates. Also, the system control unit 14 may determine whether to exclude the item having been purchased from the deletion candidates, based the item genre.

On the other hand, when it is determined that there is not the corresponding purchase history (NO in the step S19), the system control unit 14 acquires the retrieval condition from the bookmark information of the selected candidate determination item (step S20). Subsequently, the system control unit 14 determines whether the retrieval condition of the operation target item is matched with the retrieval condition of the candidate determination item (step S21). In this case, when it is determined as not matched (NO in the step S21), the system control unit 14 proceeds to step S23. That is, the system control unit 14 excludes the candidate determination item from the deletion candidate. On the other hand, when it is determined as matched (YES in the step S21), the system control unit 14 registers the item ID of the candidate determination item to the deletion candidate list (step S22). That is, the system control unit 14 selects the candidate determination item as the deletion candidate. Subsequently, the system control unit 14 proceeds to step S23. Also, when the retrieval condition of the operation target item and the retrieval condition of the candidate determination item are entirely matched with each other, the system control unit 14 may set the candidate determination item as the deletion candidate, and when partially matched, the system control unit 14 may set the candidate determination item as the deletion candidate.

In step S23, the system control unit 14 determines whether there is bookmark information that has not yet been selected in the bookmark information retrieved in step S111. In this case, when it is determined that there is the bookmark information that has not yet been selected (YES in the step S23), the system control unit 14 selects one of pieces of the unselected bookmark information (step S24). Subsequently, the system control unit 14 proceeds to step S16. The system control unit 14 repeats the processes of the steps S16 to S24, and serves as a selecting means to select the deletion candidate from the registered items in the requesting user's bookmark.

Then, when it is determined that the entire bookmark information has been selected (NO in the step S23), the system control unit 14 serves as a controlling means to generate and transmit an HTML document of a deletion candidate page, based on a deletion list (step S25). Specifically, the system control unit 14 acquires an item name of a deletion candidate item from item information corresponding to an item ID registered in the deletion list. Also, the system control unit 14 generates a URL of an item page of the deletion candidate item, based on the item ID registered in the deletion list. Then, the system control unit 14 generates an HTML document including an item name of the deletion candidate item, a tag to which the URL of the item page is set, and the like. Then, the system control unit 14 transmits the generated HTML document to the user terminal 3 of the request transmitter. When the process is completed, the system control unit 14 ends the deletion candidate suggest control process. The user terminal 3 displays a deletion candidate page, for example, as illustrated in FIG. 2, based on the received HTML document. That is, the user terminal 3 suggests the deletion candidate to the user.

The user selects the item to be deleted from the bookmark by operating a checkbox displayed in the deletion candidate region 110 of the deletion candidate page. Then, when the user selects the delete button 120, the user terminal 3 transmits the bookmark deletion request, which includes the item ID of the selected item, to the electronic commerce server 1. When receiving the bookmark deletion request, the system control unit 14 deletes bookmark information, which includes the requesting user ID and the item ID of the operation target item, from the bookmark information DB 12g. In this case, the system control unit 14 performs the deletion candidate suggest control process.

Also, when the item-selection related operation is the order operation, there is a case where the user orders an item by displaying an item page from a retrieval result page, instead of ordering and purchasing an item by displaying an item page from the bookmark. In this case, the operation target item may not be registered in the bookmark. However, in this case, the retrieval condition is designated by the user. Thus, in the step S12, even when the operation target item is not registered in the bookmark, when there is a retrieval condition held in association with the requesting user ID, the system control unit 14 may select the deletion candidate by using the retrieval condition as the retrieval condition of the operation target item.

Also, when the item-selection related operation is the exhibition operation, the item ID is not assigned to the operation target item. In this case, the system control unit 14 retrieves an item, of which the item code is matched with the operation target item, among the items registered in the bookmark. Then, the system control unit 14 performs the deletion candidate suggest control process by setting the item ID of the item, of which the item code is matched with the operation target item, as the item ID of the operation target item.

[3-2-2. Item Whose Genre is Matched with Operation Target Item]

Figure 7:
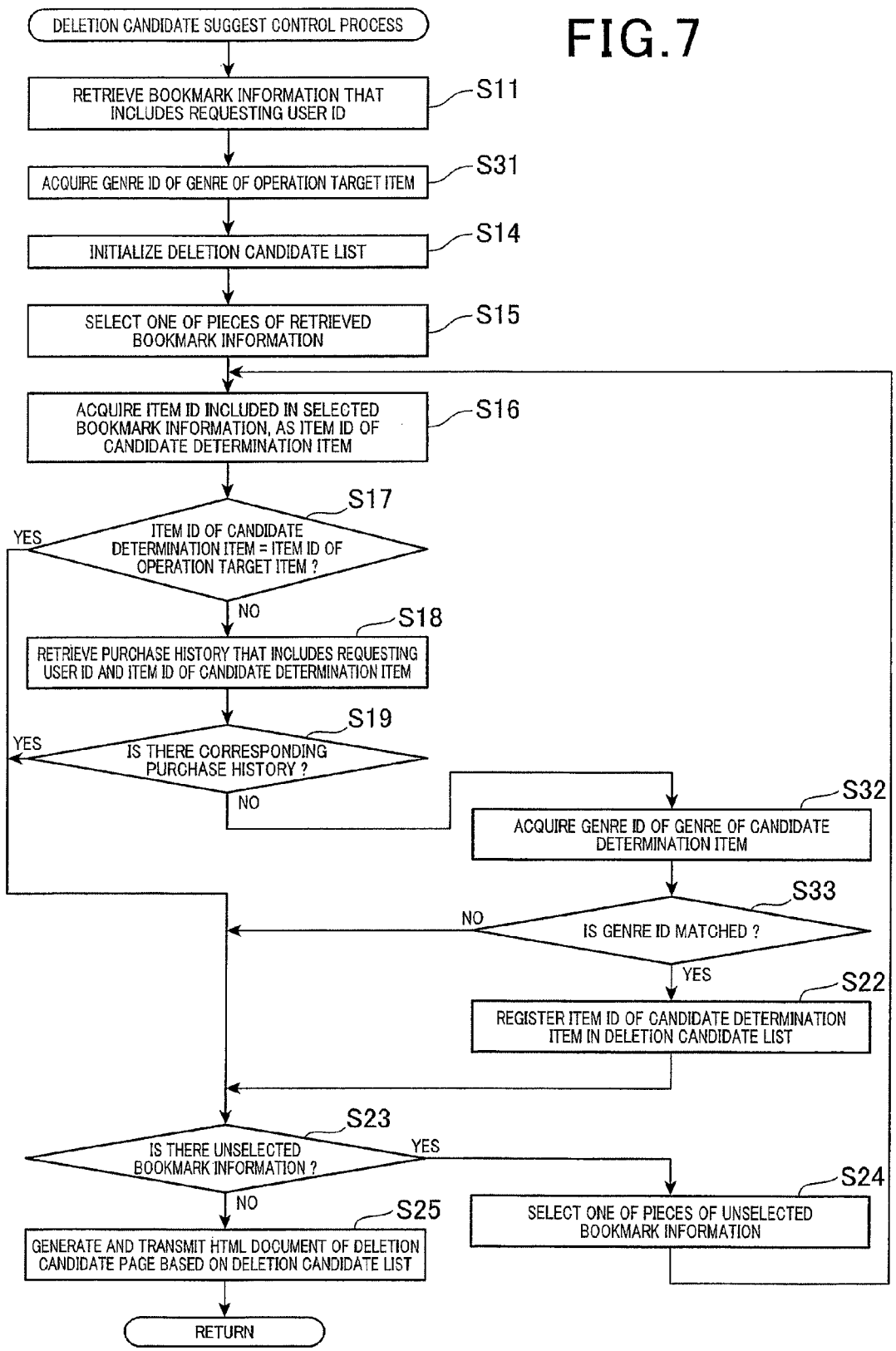
FIG. 7 is a flowchart illustrating a processing example of a deletion candidate suggest control process of the system control unit 14 of the electronic commerce server 1 when an item whose genre is matched with an operation target item is an item associated with the operation target item.

FIG. 7 is a flowchart illustrating a processing example of the deletion candidate suggest control process of the system control unit 14 of the electronic commerce server 1 when an item of which the genre is matched with an operation target item is an item associated with the operation target item. Also, in FIG. 7, the same step numbers are assigned to the same processes as those of FIG. 6.

As illustrated in FIG. 7, when the process of the step S11 is completed, the system control unit 14 acquires a genre ID of the operation target item from item information corresponding to the item ID of the operation target item (step S31). Subsequently, the system control unit 14 proceeds to step S14.

In step S19, when it is determined that there is not a corresponding purchase history (NO in the step S19), the system control unit 14 acquires a genre ID of the candidate determination item from item information corresponding to the item ID of the candidate determination item (step S32). Subsequently, the system control unit 14 determines whether the genre ID of the operation target item is matched with the genre ID of the candidate determination item (step S33). That is, the system control unit 14 determines whether the operation target item and the candidate determination item are items belonging to the same genre. In this case, when it is determined as not matched (NO in the step S33), the system control unit 14 proceeds to step S23. On the other hand, when it is determined as matched (YES in the step S33), the system control unit 14 registers the item ID of the candidate determination item to the deletion candidate list (step S22).

Also, the system control unit 14 may determine whether the genre IDs of the ancestor genres of the genre indicated by the genre IDs are matched, instead of the genre ID set to the item information. That is, the system control unit 14 may determine whether the operation target item and the candidate determination item belong to the same genre in not a genre of the lowest level but a genre higher than that genre. The parent genre of the genre defined by the genre information can be specified by the parent genre ID included in the genre information registered in the genre information DB 12b. Therefore, the genre ID of the ancestor genre can be acquired from the genre information DB 12b by using the parent genre ID as a clue.

Also, when the item-selection related operation is the exhibition operation, the system control unit 14 acquires the genre ID corresponding to the item code of the operation target item from the catalog DB in step S31.

[3-2-3. Item Used in Stage Prior to Operation Target Item]

Figure 8:
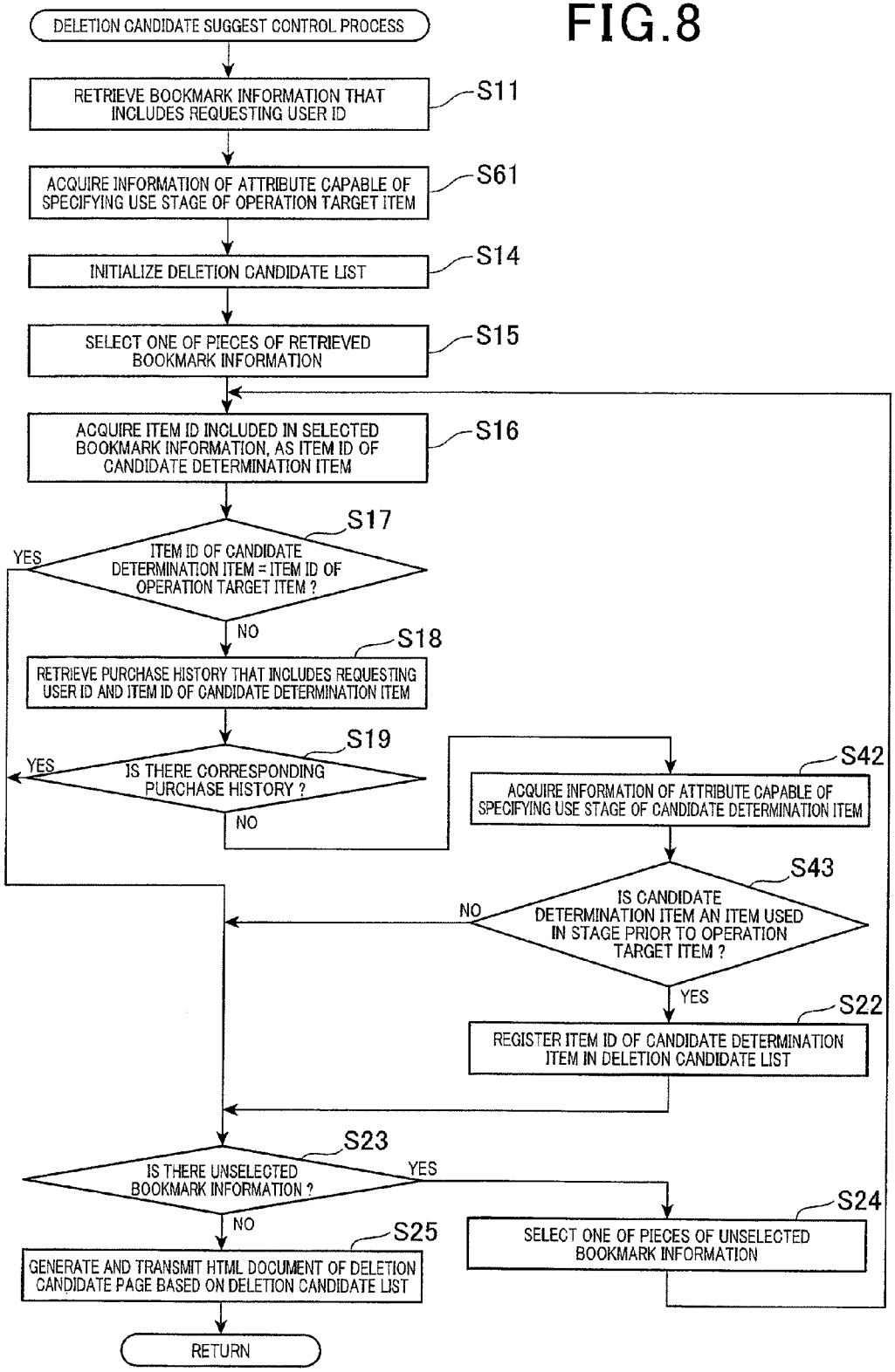
FIG. 8 is a flowchart illustrating a processing example of a deletion candidate suggest control process of the system control unit 14 of the electronic commerce server 1 when an item used in a stage prior to an operation target item is an item associated with the operation target item.

FIG. 8 is a flowchart illustrating a processing example of the deletion candidate suggest control process of the system control unit 14 of the electronic commerce server 1 when an item used in a stage prior to an operation target item is an item associated with the operation target item. Also, in FIG. 8, the same step numbers are assigned to the same processes as those of FIG. 6.

As illustrated in FIG. 8, when the process of the step S11 is completed, the system control unit 14 acquires information indicating an attribute capable of specifying a stage where the operation target item is used (step S41). For example, the system control unit 14 acquires an item name of the operation target item, an item description, a genre ID, and the like from the item information corresponding to the item ID of the operation target item. Subsequently, the system control unit 14 specifies the process of applying to the operation target item, based on the information acquired from the item information. For example, when the operation target item is a shoes item, the system control unit 14 determines that a growth process of the user is applied. Also, for example, when the operation target item is a golf club item, the system control unit 14 determines that a process showing an improvement of a user's ability is applied. Also, when the process to be applied cannot be specified, the system control unit 14 ends the deletion candidate suggest control process, without performing the selection of the deletion candidate.

When the process to be applied is specified, the system control unit 14 acquires information indicating an attribute of an item capable of specifying a stage where the operation target item is used in that process. For example, when the operation target item is a book for ability testing that measures ability by a score, the system control unit 14 acquires a character string indicating a score such as "600 points" or "700 points". Also, for example, when the operation target item is a shoes item, there is a case where the genre is divided according to a shoe size. Thus, the system control unit 14 may acquire the shoe size based on the genre ID, and may acquire a character string indicating the shoe size from an item name or an item description. Also, for example, when the operation target item is the golf club, the system control unit 14 acquires a character string indicating a grade, such as "beginning level" or "intermediate level", from an item name or an item description. Also, for example, when the operation target item is serial books, the system control unit 14 acquires a character string indicating a volume number, such as "volume 1" or "volume 2", from an item name or an item description. Also, when the information indicating the item attribute cannot be acquired, the system control unit 14 ends the deletion candidate suggest control process, without performing the selection of the deletion candidate. When the information indicating the item attribute is acquired, the system control unit 14 proceeds to step S14.

When it is determined in the step S19 that there is not the corresponding purchase history (NO in the step S19), the system control unit 14 acquires information indicating an attribute capable of specifying a stage where the candidate determination item is used (step S42). This process is the same as the process of the step S41, except that the item ID is different. Also, when the process to be applied cannot be specified, when the process to be applied to the operation target item is different from the process to be applied to the candidate determination item, or when the information indicating the item attribute cannot be acquired, the system control unit 14 proceeds to step S23 by excluding the candidate determination item from the deletion candidate.

Subsequently, the system control unit 14 determines whether the candidate determination item is used in a stage prior to the operation target item, based on the information indicating the item attribute (step S43). For example, in the case of a book for ability testing that measures ability by a score, when the target score of the candidate determination item is lower than the target score of the operation target item, the system control unit 14 determines that the candidate determination item is used in the stage prior to the operation target item. Also, for example, in the case where the operation target item is the shoes item, when the shoe size of the candidate determination item is smaller than the shoe size of the operation target item, the system control unit 14 determines that the candidate determination item is used in the stage prior to the operation target item. Also, in the case where the operation target item is the golf club, when the grade of the user's ability corresponding to the candidate determination item is lower than the grade of the user's ability corresponding to the operation target item, the system control unit 14 determines that the candidate determination item is used in the stage prior to the operation target item. Also, in the case where the operation target item is the serial books, when the volume number of the candidate determination item is smaller than the volume number of the operation target item, the system control unit 14 determines that the candidate determination item is used in the stage prior to the operation target item.

When it is determined that the candidate determination item is not used in the stage prior to the operation target item (NO in the step S43), the system control unit 14 proceeds to step S23. On the other hand, when it is determined that the candidate determination item is used in the stage prior to the item to be operate (YES in the step S43), the system control unit 14 registers the item ID of the candidate determination item to the deletion candidate list (step S22).

Also, in the case where the item-selection related operation is the exhibition operation, the system control unit 14 acquires the formal name, genre ID, and specification of the item corresponding to the item code of the operation target item from the catalog DB in step S41. Then, the system control unit 14 acquires information indicating an attribute capable of specifying a stage where the operation target item is used, based on the acquired information.

[3-2-4. Item Registered in Bookmark at Same Time Period as Operation Target Item]

Figure 9:
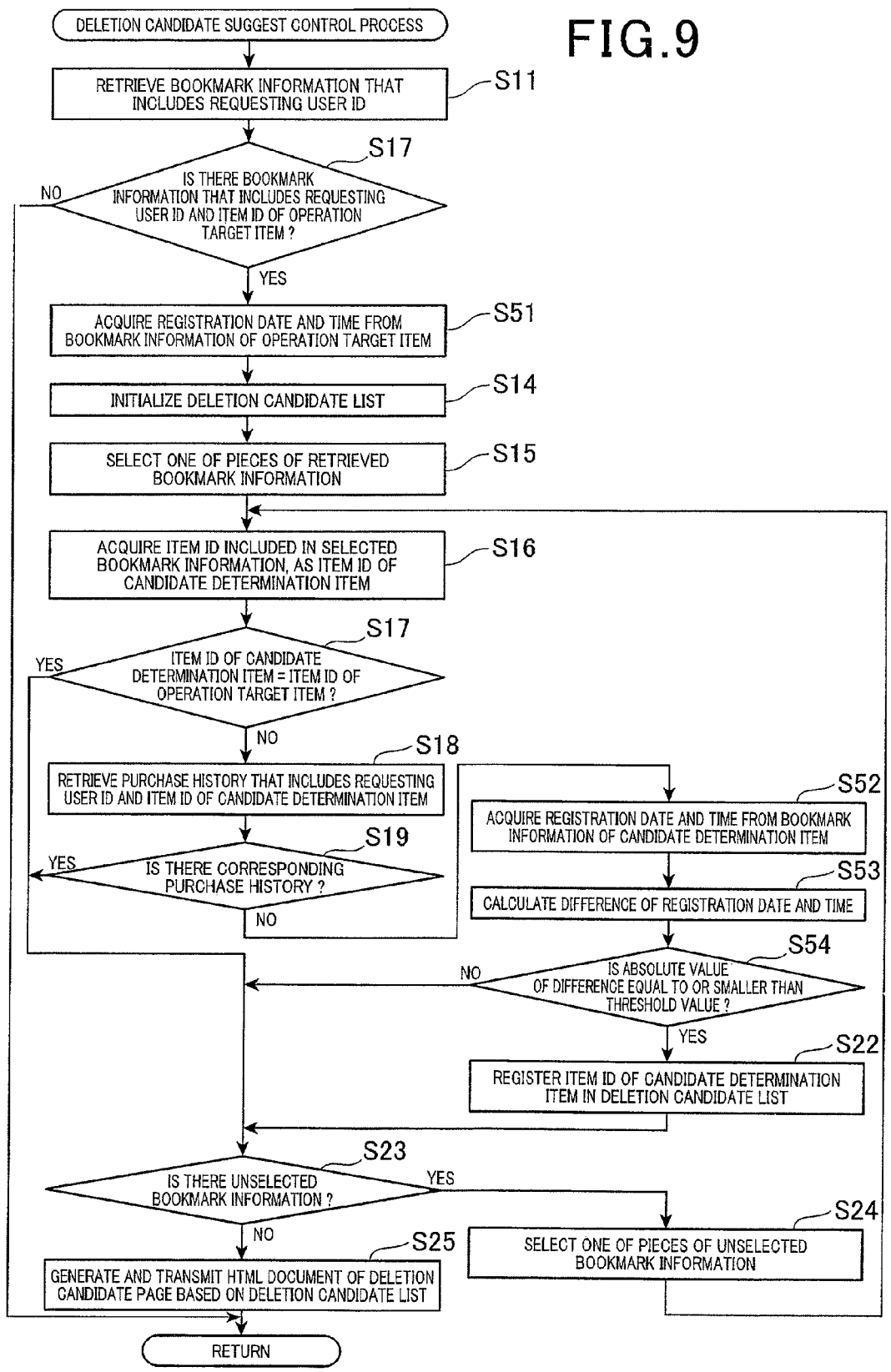
FIG. 9 is a flowchart illustrating a processing example of a deletion candidate suggest control process of the system control unit 14 of the electronic commerce server 1 when an item registered in bookmark at the same time period as an operation target item is an item associated with the operation target item.

FIG. 9 is a flowchart illustrating a processing example of the deletion candidate suggest control process of the system control unit 14 of the electronic commerce server 1 when an item registered in bookmark at the same time period as an operation target item is an item associated with the operation target item. Also, in FIG. 9, the same step numbers are assigned to the same processes as those of FIG. 6.

As illustrated in FIG. 9, when it is determined in step S12 that there is the bookmark information of the operation target item (YES in the step S12), the system control unit 14 acquires the registration date and time from the bookmark information of the operation target item (step S51). Subsequently, the system control unit 14 proceeds to step S14.

When it is determined in step S19 that there is not the corresponding purchase history (NO in the step S19), the system control unit 14 acquires the registration date and time from the bookmark information of the candidate determination item (step S52). Subsequently, the system control unit 14 calculates a difference between the registration date and time of the operation target item and the registration date and time of the candidate determination item (step S53). Subsequently, the system control unit 14 determines whether an absolute value of the calculated difference is equal to or less than a preset threshold value (step S54). That is, the system control unit 14 determines whether the candidate determination item was registered in the bookmark at the same time period when the operation target item was registered in the bookmark. In this case, a range within before and after the threshold value from the registration date and time of the operation target item is the date and time determined as the same time period as the registration date and time of the operation target item. The administrator can arbitrarily set the threshold value (for example, one hour, one day, one week, one month, or the like). When it is determined that the absolute value of the calculated difference is not equal to or less than the threshold value (NO in the step S54), the system control unit 14 proceeds to step S23. On the other hand, when it is determined that the absolute value of the calculated difference is equal to or less than the threshold value (YES in the step S54), the system control unit 14 registers the item ID of the candidate determination item to the deletion candidate list (step S22).

[3-2-5. Item Whose Item Page is Browsed at Same Time Period as Operation Target Item]

Figure 10:
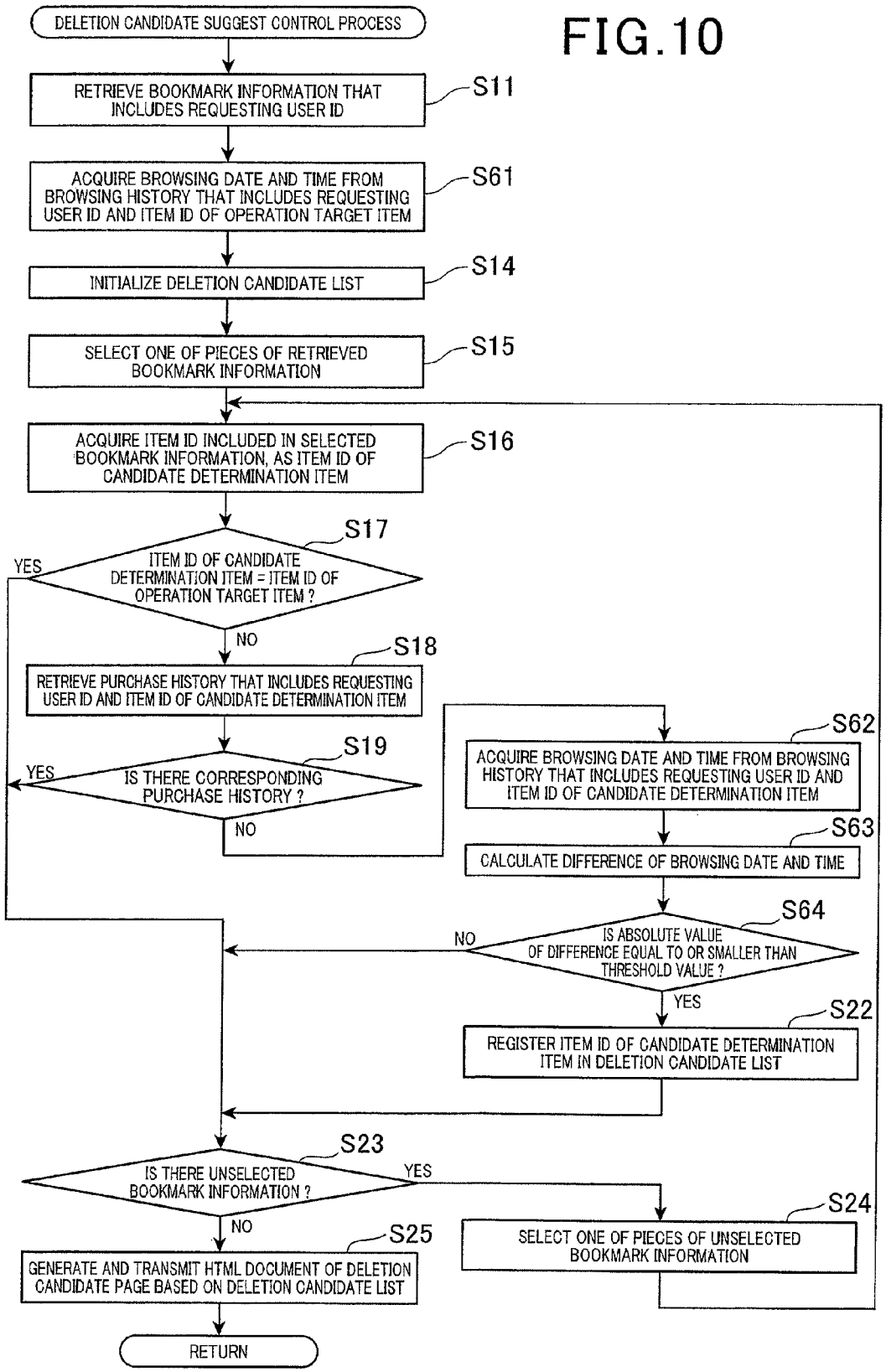
FIG. 10 is a flowchart illustrating a processing example of a deletion candidate suggest control process of the system control unit 14 of the electronic commerce server 1 when an item whose item page has been browsed at the same time period as an operation target item is an item associated with the operation target item.

FIG. 10 is a flowchart illustrating a processing example of the deletion candidate suggest control process of the system control unit 14 of the electronic commerce server 1 when an item of which the item page has been browsed at the same time period as an operation target item is an item associated with the operation target item. Also, in FIG. 10, the same step numbers are assigned to the same processes as those of FIG. 6.

As illustrated in FIG. 10, when the process of the step S11 is completed, the system control unit 14 retrieves a browsing history, which includes a requesting user ID and an item ID of the operation target item, from the browsing history DB 12e, and acquires a browsing date and time from the retrieved browsing history (step S61). Subsequently, the system control unit 14 proceeds to step S14.

When it is determined in the step S19 that there is not a corresponding purchase history (NO in the step S19), the system control unit 14 retrieves a browsing history, which includes a requesting user ID and an item ID of the candidate determination item, from the browsing history DB 12e, and acquires a browsing date and time from the retrieved browsing history (step S62). Subsequently, the system control unit 14 calculates a difference between the browsing date and time of the operation target item and the browsing date and time of the candidate determination item (step S63). Subsequently, the system control unit 14 determines whether an absolute value of the calculated difference is equal to or less than a preset threshold value (step S64). That is, the system control unit 14 determines whether an item page of the candidate determination item was browsed at the same time period when an item page of the operation target item was browsed. In this case, a range within before and after the threshold value from the browsing date and time of the item page of the operation target item is the date and time determined as the same time period as the browsing date and time of the item page of the operation target item. The administrator can arbitrarily set the threshold value (for example, one hour, one day, one week, one month, or the like). When it is determined that the absolute value of the calculated difference is not equal to or less than the threshold value (NO in the step S64), the system control unit 14 proceeds to step S23. On the other hand, when it is determined that the absolute value of the calculated difference is equal to or less than the threshold value (YES in the step S64), the system control unit 14 registers the item ID of the candidate determination item to the deletion candidate list (step S22).

[3-2-6. Item Used in Season Prior to Season when Operation Target Item is Used]

Figure 11:
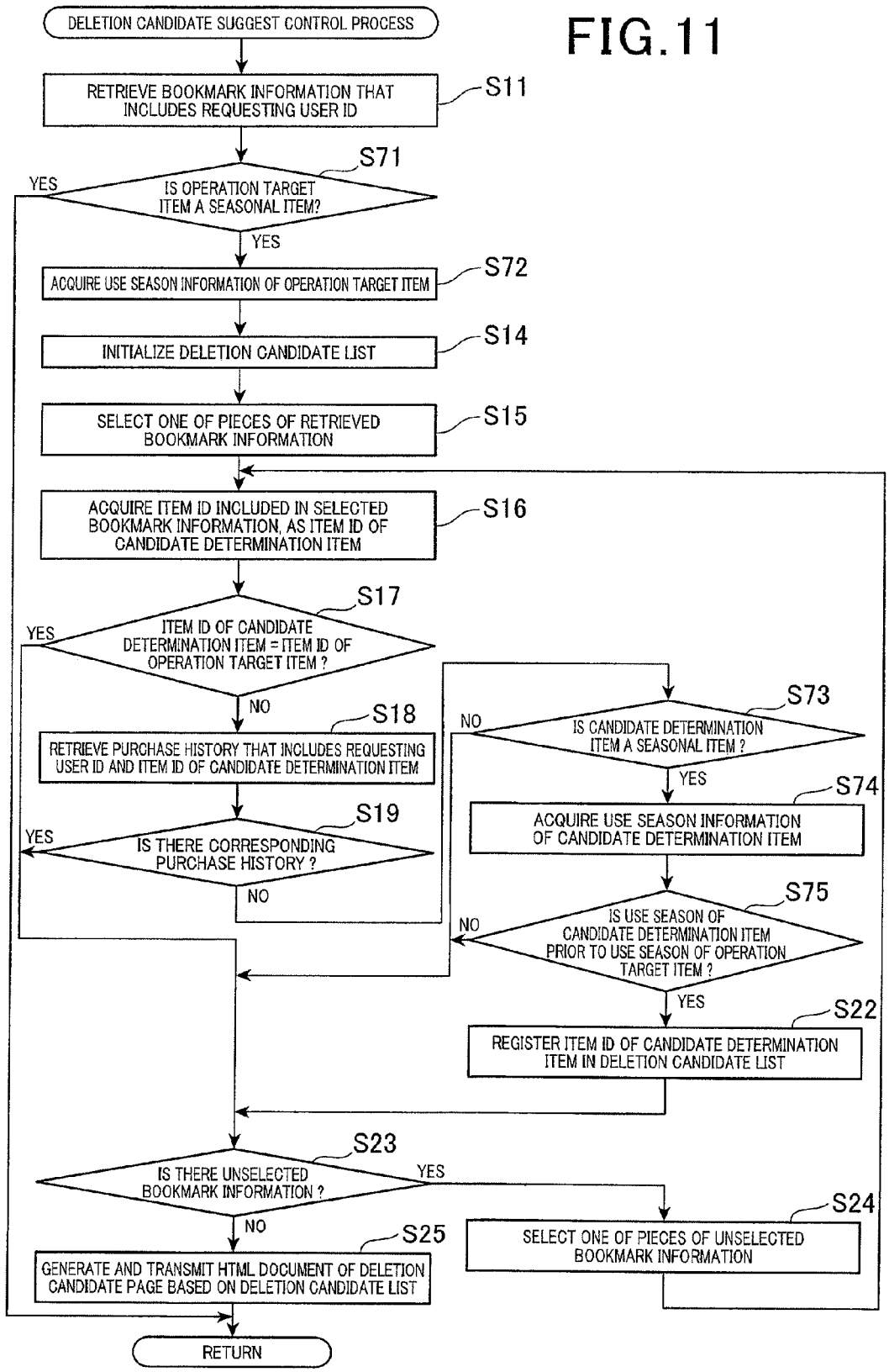
FIG. 11 is a flowchart illustrating a processing example of a deletion candidate suggest control process of the system control unit 14 of the electronic commerce server 1 when an item registered in bookmark at the same time period as an operation target item is an item associated with the operation target item.

FIG. 11 is a flowchart illustrating a processing example of the deletion candidate suggest control process of the system control unit 14 of the electronic commerce server 1 when an item used in a season prior to a season when an operation target item is used is an item associated with the operation target item. Also, in FIG. 11, the same step numbers are assigned to the same processes as those of FIG. 6.

As illustrated in FIG. 11, when the process of the step S11 is completed, the system control unit 14 determines whether the operation target item is a seasonal item (step S71). Specifically, the system control unit 14 acquires a genre ID from item information corresponding to an item ID of the operation target item. Subsequently, the system control unit 14 determines whether use season information is set in genre information corresponding to the acquired genre ID. In this case, when it is determined that the use season information is not set in the genre information, the system control unit 14 determines that the operation target item is not the seasonal item (NO in the step S71). In this case, the system control unit 14 ends the deletion candidate suggest control process. On the other hand, when the use season information is set in the genre information, the system control unit 14 determines that the operation target item is the seasonal item (YES in the step S71). In this case, the system control unit 14 acquires the use season information set in the genre information as the use season information of the operation target item (step S72). Subsequently, the system control unit 14 proceeds to step S14.

When it is determined in step S19 that there is not the corresponding purchase history (NO in the step S19), the system control unit 14 determines whether the candidate determination item is the seasonal item (step S73). This process is the same as the process of the step S71, except that the item ID is different. In this case, when it is determined that the candidate determination item is not the seasonal item (NO in the step S73), the system control unit 14 proceeds to step S23. On the other hand, when it is determined that the candidate determination item is the seasonal item (YES in the step S73), the system control unit 14 acquires the use season information set in the genre information of the genre of the candidate determination item as the use season information of the candidate determination item (step S74).

Subsequently, the system control unit 14 determines whether the season when the candidate determination item is used is a season prior to the season when the operation target item is used, based on the acquired use season information (step S75). In this case, when it is determined that the season when the candidate determination item is used is not a season prior to the season when the operation target item is used (NO in the step S75), the system control unit 14 proceeds to step S23. On the other hand, when it is determined that the season when the candidate determination item is used is a season prior to the season when the operation target item is used (YES in the step S75), the system control unit 14 registers the item ID of the candidate determination item to the deletion candidate list (step S22).

[4. Use Example of Bookmark]

As described above, among the items registered in the bookmark by the user, the items, which may be unnecessary to register in the bookmark, are suggested to the user. Therefore, the deletion of the items, which are unnecessary for the user to actually register in the bookmark, from the bookmark is supported. Thus, the bookmark of each user can be appropriately organized.

For example, the user's favorite item, the item being the purchase candidate, the user's interesting item, and the like are registered in the bookmark. That is, it can be considered that the bookmark reflects the user's interest, demand, and popularity with respect to the item. Thus, since the uninteresting item being the item unnecessary to register in the bookmark is appropriately deleted, the bookmark of each user more accurately reflects the user's interest, demand, and popularity with respect to the item. The appropriate organization of the bookmark means this.

The use example of the appropriately organized bookmark information will be described below.

[4-1. Ranking of Bookmarks]

In the first use example, the electronic commerce server 1 determines the ranking of each item, based on the number of registrations to the bookmark. Specifically, the electronic commerce server 1 calculates the number of registrations of each item to the bookmark, based on the bookmark information registered in the bookmark information DB 12g. Subsequently, the electronic commerce server 1 determines the ranking of the items in descending order of the number of registrations to the bookmark. Subsequently, the electronic commerce server 1 generates a web page showing the ranking of the number of registrations to the bookmark. Herein, for example, the electronic commerce server 1 may generate a web page showing the ranking of all items or may generate a web page showing the ranking with respect to each genre. Then, the electronic commerce server 1 transmits the web page showing the ranking in response to a request from the user terminal 3.

Regarding the ranking based on the number of registrations to the bookmark, for example, there is a ranking based on a sales volume. Since the sales volume is influenced by factors such as the price of item, the presence of items in stock, and the like, there is a case where the ranking based on the sales volume does not accurately reflect the user's interest, demand, popularity, and the like. In contrast, since the ranking based on the number of registrations to the bookmark is influenced by such factors, it can accurately reflect the user's interest, demand, popularity, and the like.

[4.2. Demand Prediction of Item]

In the second use example, the electronic commerce server 1 predicts the demand for items, based on the number of registrations to the bookmark. Specifically, the electronic commerce server 1 calculates the number of registrations to the bookmark with respect to items targeted for demand prediction, based on the bookmark information registered in the bookmark information DB 12g. Subsequently, the electronic commerce server 1 performs the demand prediction in such a manner that as the number of registrations to the bookmark is larger, there is the demand for the item. In this case, the electronic commerce server 1 may determine that there is the demand for one item with respect to one registration to the bookmark.

There is a case where the item belonging to the same genre as the genre to which the item targeted for demand prediction belongs is registered in a certain user's bookmark. In this case, according to the genre of the item, the magnitude of the demand for the item from the user registering the item targeted for demand prediction in the bookmark may be reduced. For example, in the case of an item of a genre such as a refrigerator, it is common that a single user purchases only one item at the same time. Therefore, when a plurality of refrigerator items is registered in the bookmark, it is estimated that the plurality of refrigerator items is registered as purchase candidates for comparison, and one item will be actually purchased. Thus, for example, for each user registering the item targeted for demand prediction to the bookmark, the electronic commerce server 1 may calculate the number of registrations to the bookmark with respect to the items belonging to the genre to which the item for targeted for demand prediction, and set the demand for the item targeted for demand prediction as a fraction of the calculated number of registrations. On the other hand, in the case of an item of a genre such as clothes, a single user may purchase a plurality of items at the same time. Thus, for example, the electronic commerce server 1 may set the demand from each user, who registers the item targeted for demand prediction to the bookmark, as 1, regardless of the number of registrations to the bookmark with respect to the item of the genre to which the item targeted for demand prediction.

Also, when predicting the demand for the plurality of items of the same genre, the electronic commerce server 1 may predict the magnitude of the demand for the plurality of items, depending on the magnitude of the number of registrations to the bookmark. For example, when the number of registrations of an item A to the bookmark is larger than the number of registrations of an item B to the bookmark, the electronic commerce server 1 performs the demand prediction like "there is the demand for the item A rather than the item B".

When performing the demand prediction, the electronic commerce server 1 transmits a web page displaying the prediction result to the shop terminal 2.

As a conventional demand prediction, there is a demand prediction based on a past sales volume. However, the demand prediction based on the past sales volume may not predict the demand accurately. As described above, this is because the sales volume is influenced by factors such as the price of item or the presence of items in stock. Also, this is because the past sales volume indicates an amount of consumption of the demand so far. That is, there is a case where when the past sales volume is large, most of the original demand has been consumed in the sales of the item so far. In contrast, the items the user may purchase in the future are registered in the bookmark. Therefore, it can be said that the future demand rather than past sales results is reflected in the bookmark more accurately.

[4-3. Recommendation of Item]

In the third use example, the electronic commerce server 1 performs a process for recommending items being sold in the online mall or the like to the user, based on the number of registrations to the bookmark. This is because the user's interest in the item is reflected to the bookmark. By appropriately organizing the bookmark, a ratio of items unnecessary to register in the bookmark is reduced with respect to the entire bookmark, making it possible to appropriately recommend the item.

Specifically, the electronic commerce server 1 selects the item itself registered in the bookmark as the recommended item, and selects the item associated with the item registered in the bookmark as the recommended item. In this case, examples of the item associated with the item registered in the bookmark include an item of which the genre is the same as the item registered in the bookmark, and an item whose shop of a distribution source is the same as the item registered in the bookmark. When the recommended item is selected, the electronic commerce server 1 may, for example, transmit an email recommending the selected item to the user, or transmit a web page of an online mall to the user terminal 3 after inserting an advertisement of the recommended item thereinto.

As described above, according to the present embodiment, when the item-selection related operation is performed by the user, the system control unit 14 of the electronic commerce server 1 selects the item associated with the item targeted for operation, as the deletion candidate, among the items registered in the bookmark, based on the bookmark information registered in the bookmark information DB 12g, and suggests the selected deletion candidate by the user terminal 3.

Therefore, since the item highly probable to be unnecessary to register in the bookmark can be suggested as the deletion candidate, it is easy for the user to delete the unnecessary item from the bookmark. Therefore, since the appropriate deletion of the item, which is unnecessary to register in the bookmark, from the bookmark is assisted, it is possible to prevent the enlargement of the bookmark.

Also, according to the present embodiment, a single range of the item attribute indicating the association with the item targeted for operation has been set, so as to determine whether the item is an item associated with the item targeted for operation. Therefore, among the items registered in the bookmark, the item existing within the set single range has been selected to be the deletion candidate, as the item associated with the operation target item. However, a plurality of attribute ranges corresponding to that item attribute may be determined, and the electronic commerce server 1 may select items associated with the operation target item as the deletion candidates with respect to each of the plurality of attribute ranges, and suggest the selected deletion candidates with respect to each of the attribute range.

When a large number of items are included in a predetermined attribute range, the large number of items are suggested to the user as the deletion candidates. Since the user needs to find out the unnecessary items from the large number of deletion candidates, there is a case where the operation of deleting the items from the bookmark is troublesome for the user. Therefore, if the deletion candidates are suggested with respect to each of the plurality of attribute ranges, the user can select a range that is easy to find out the unnecessary items. Also, the user can select a range that is considered by the user in association with the item targeted for operation among the plurality of attribute ranges.

Hereinafter, a case in which items of which the genre is matched with the operation target item are selected as the items associated with the operation target item will be described as an example.

In this case, the attribute indicating the association is the genre of the item. In the present embodiment, a range of an item belonging to a genre of a level among genres of a plurality of levels to which the operation target item belongs has been assumed as a range of an item associated with the operation target item. In this regard, with respect to each of the plurality of levels to which the operation target item belongs, the item belonging to the same level as the operation target item may be selected as the deletion candidate. That is, operation objects are selected like an item belonging to a genre of a level 1 equal to that of the operation target item, an item belonging to a genre of a level 2 equal to that of the operation target item, an item belonging to a genre of a level 3 equal to that of the operation target item, and the like. Also, the level range for selecting the deletion candidate is arbitrarily determined.

In this case, a display example of the deletion candidate page will be described. For example, it is assumed that 200 items from item 1 to item 200 among the items registered in the bookmark belong to the genre of the level 1 to which the operation target item belongs. Also, it is assumed that item 1 to item 100 belong to the genre of the level 2 to which the operation target item belongs, item 1 to item 30 belong to the genre of the level 3 to which the operation target item belongs, item 1 to item 10 belong to the genre of the level 4 to which the operation target item belongs, and item 1 to item 5 belong to the genre of the level 5 to which the operation target item belongs.

Figure 12A:
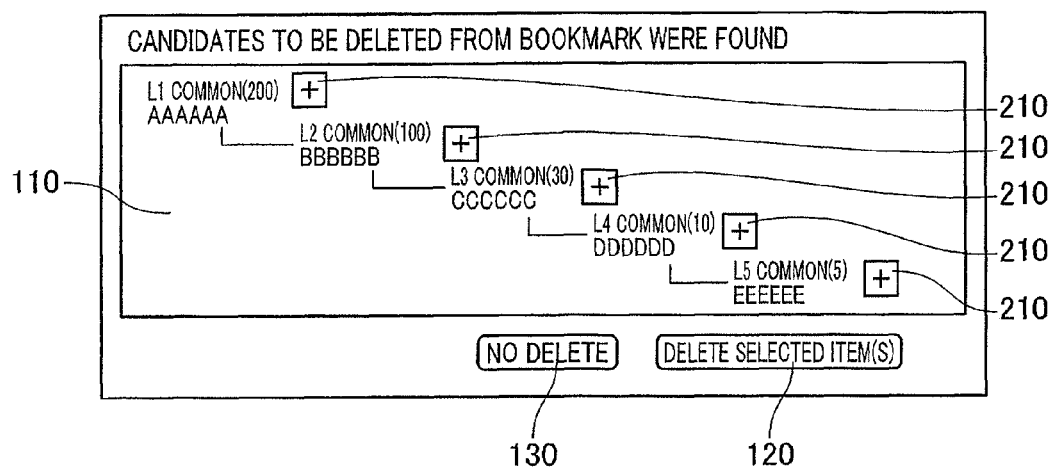
FIGS. 12A and 12B are diagrams illustrating a first example of a screen display of a deletion candidate page according to a modification.
Figure 12B:
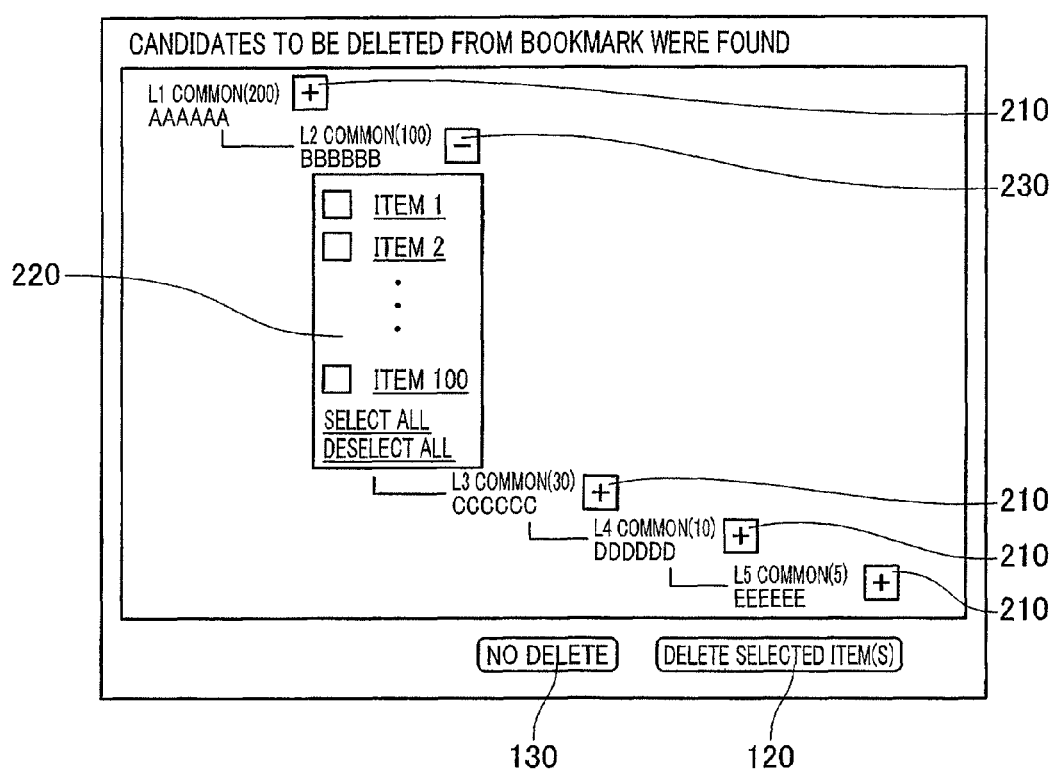

FIGS. 12A and 12B are diagrams illustrating a first example of a screen display of a deletion candidate page according to a modification. In FIGS. 12A and 12B, the same reference numbers are assigned to the same elements as those of FIG. 2.

First, the deletion candidate page illustrated in FIG. 12A is displayed on the user terminal 3. As illustrated in FIG. 12A, the delete button 120, the no delete button 130, and the like are displayed on the deletion candidate page. Also, the level names (for example, "L1" or the like) of the genres on which the selection of the deletion candidate has been performed, and the genre names (for example, "AAAA" or the like) are hierarchically displayed on the deletion candidate page. In FIG. 2A, the level names and the genre names from the level 1 to the level 5 are displayed. Also, the number of the extracted deletion candidates is displayed beside the level name. For example, in the genre of the level 3, 30 deletion candidates are selected. Also, plus (+) buttons 210 corresponding to each of the level names and each of the genre names are displayed.

When the user selects a certain plus button 210, a deletion candidate region 220 is displayed under a genre name corresponding to the selected plus button 210 as illustrated in FIG. 12B. The display content of the deletion candidate region 220 is basically the same as the display content of the deletion candidate region 110 illustrated in FIG. 2. In FIG. 12B, the deletion candidate region 220 corresponding to the genre of the level 2 is displayed. Therefore, the item names of the item 1 to the item 100 are displayed in the deletion candidate region 220. When the deletion candidate region 220 is displayed by the selection of the plus button 210, the selected plus button 210 changes to a minus (-) button 230. When the user selects the minus button 230, the displayed deletion candidate region 220 is erased from the screen. Then, the selected minus button 230 changes to the plus button 210. Also, the deletion candidate regions 220 for the plurality of levels can also be displayed.

The user can display a list of deletion candidates for a genre of an arbitrary level by the selection of the plus button 210 or the minus button 230. Then, an arbitrary item can be selected from the displayed deletion candidates and be deleted from the bookmark. For example, the user may select a genre of a certain level, in which the number of deletion candidates is the number at which the unnecessary items are easy to find out, or may select the genre of the level at which the user considers that the item associated with the operation target item belongs.

Figure 13A:
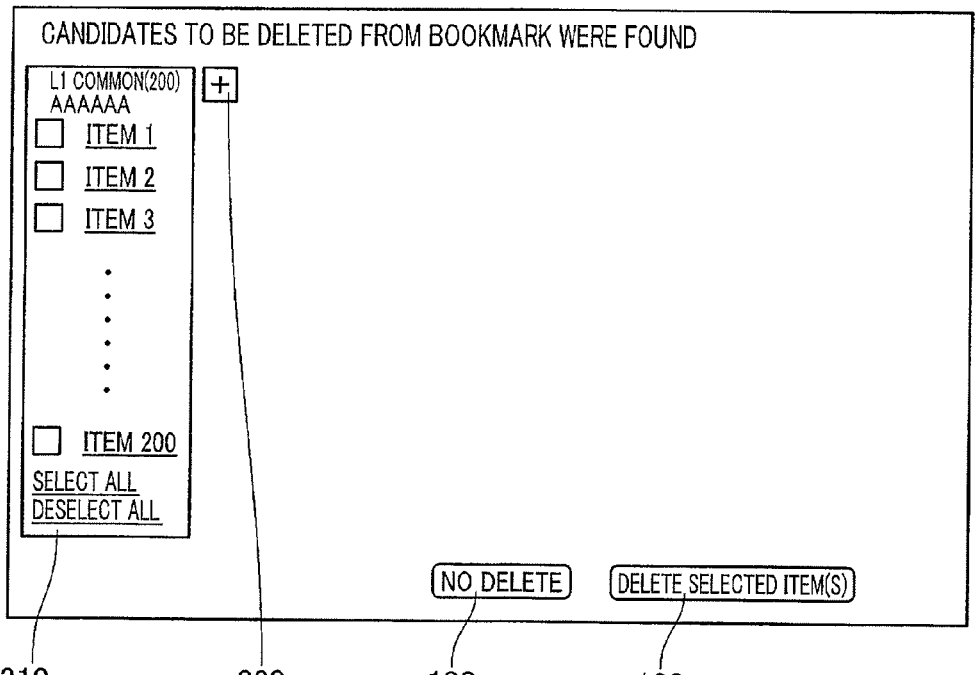
FIGS. 13A and 13B are diagrams illustrating a second example of a screen display of a deletion candidate page according to a modification.
Figure 13B:
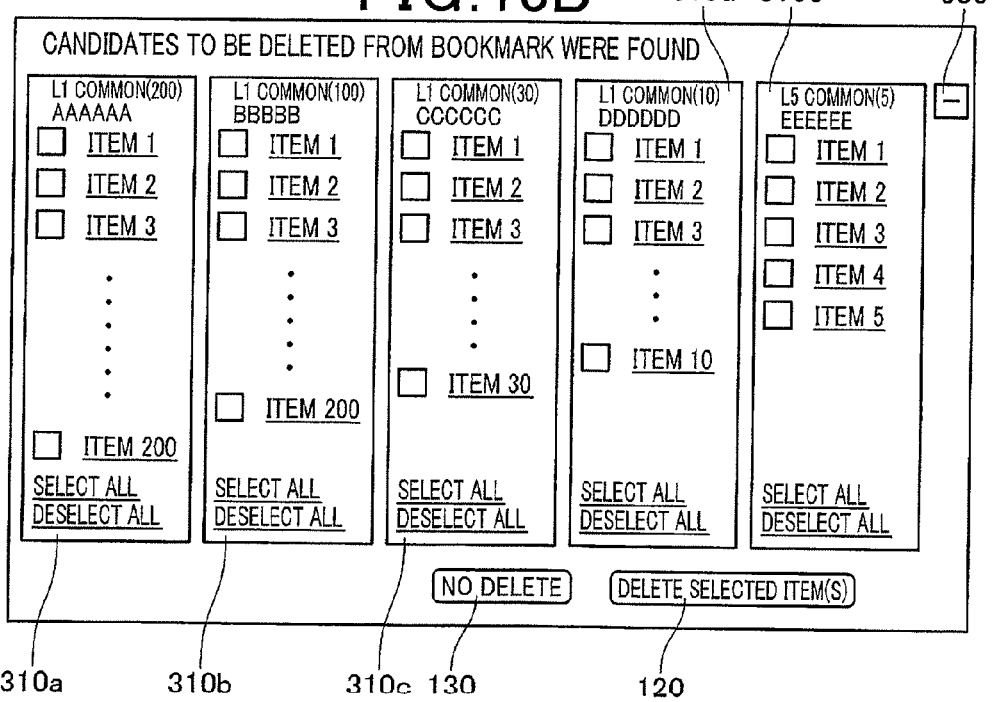

FIGS. 13A and 13B are diagrams illustrating a second example of a screen display of a deletion candidate page according to a modification. In FIGS. 13A and 13B, the same reference numbers are assigned to the same elements as those of FIG. 2.

First, the deletion candidate page illustrated in FIG. 13A is displayed on the user terminal 3. As illustrated in FIG. 13A, the delete button 120, the no delete button 130, the deletion candidate region 310a, and the like are displayed on the deletion candidate page. In the deletion candidate region 310a, the item 1 to the item 200 are displayed as the deletion candidates for the genre of the level 1. Also, the display content of the deletion candidate region 310 is basically the same as the display content of the deletion candidate region 110 illustrated in FIG. 2. A plus button 320 is displayed beside the deletion candidate region 310.

When the user selects the plus button 320, a deletion candidate region 310b to a deletion candidate region 310e, as well as the deletion candidate region 310a, are newly displayed as illustrated in FIG. 13B. Also, the plus button 320 is erased from the screen, and a minus button 330 is displayed beside the deletion candidate region 310e. In the deletion candidate region 310b, the item 1 to the item 100 are displayed as the deletion candidates for the genre of the level 2. Also, in the deletion candidate region 310c, the item 1 to the item 30 are displayed as the deletion candidates for the genre of the level 3. Also, in the deletion candidate region 310d, the item 1 to the item 10 are displayed as the deletion candidates for the genre of the level 4. Also, in the deletion candidate region 310e, the item 1 to the item 5 are displayed as the deletion candidates for the genre of the level 5. The display content of the deletion candidate regions 310b to 310e are basically the same as the display content of the deletion candidate region 110. When the user selects the minus button 330, the displayed deletion candidate regions 310b to 310e are erased from the screen and are returned to the display state illustrated in FIG. 13A.

Also, when the user selects the plus button 320 in the state illustrated in FIG. 13A, only the deletion candidate region 310b may be newly displayed, and the plus button 320 and the minus button 330 may be displayed beside the deletion candidate region 310b. Then, when the user selects the plus button 320 or the minus button 330, the deletion candidate region 310b may be erased from the screen, or the new deletion candidate region 310c may be displayed.

Also, in each genre, the child genre to which the item targeted for operation among the child genres of that genre belongs may be excluded from the deletion candidate selection range. For example, in the above-described example, the item 101 to the item 200 among the item 1 to the item 200 are suggested as the deletion candidates corresponding to the genre of the level 1. Also, the item 31 to the item 100 are suggested as the deletion candidates corresponding to the genre of the level 2. Also, the item 11 to the item 30 are suggested as the deletion candidates corresponding to the genre of the level 3. Also, the item 6 to the item 10 are suggested as the deletion candidates corresponding to the genre of the level 4. Also, the item 1 to the item 5 are suggested as the deletion candidates corresponding to the genre of the level 5.

A processing example of the system control unit 14 of the electronic commerce server 1 will be described with reference to FIG. 7. In step S31, the system control unit 14 acquires, for example, the genre ID of the genre of the level 1 to which the operation target item belongs. Also, in step S32, the system control unit 14 acquires the genre ID of the genre of the level 1 to which the candidate determination item belongs. Subsequently, the system control unit 14 determines whether the genre ID of the genre of the level 1 of the operation target item is matched with the genre ID of the genre of the level 1 of the candidate determination item (step S33). Then, when it is determined as matched (YES in the step S33), the system control unit 14 registers the item ID of the candidate determination item to the deletion candidate list (step S22).

In step S23, when it is determined that all pieces of the retrieved bookmark information are selected (NO in the step S23), the item belonging to the genre of the level 1 equal to that of the operation target item is set. Thus, the system control unit 14 selects, among the items belonging to the genre of the level 1 equal to that of the operation target item, items belonging to the genre of the level 2 equal to that of the operation target item. Therefore, the system control unit 14 selects the deletion objects for each genre, for example, from the genre of a high level to the genre of a low level. Then, in step S25, the system control unit 14 generates the HTML document of the deletion candidate page, such that the deletion candidates for each genre are displayed.

Also, the item attribute capable of selecting the deletion candidate in each of the plurality of ranges is not limited to the genre. For example, the registration time of the bookmark, the browsing time of the item page, and the like can also be applied. For example, the electronic commerce server 1 may perform the selection in each range, such as one hour, one day, one week, and one month before and after the date and time of registration of the operation target item to the bookmark. Also, the electronic commerce server 1 may perform the selection in each range, such as one hour, one day, one week, and one month before and after the browsing date and time of the item page of the operation target item. Also, it can be applied even when the stage where the item is used is different according to the attribute of the item. For example, in the example of the golf club, when the operation target item is the golf club for seniors, the electronic commerce server 1 can perform the selection in each range, such as a golf club for beginners and intermediates, a golf club for beginners only, and a golf club for intermediates only.

Also, instead of suggesting the deletion candidates to the user terminal 3 with respect to each of the plurality of ranges, the electronic commerce server 1 may suggest the deletion candidates with respect to only the range in which the number of selected deletion candidates is equal to or less than a preset threshold value and the number of deletion candidates is closest to the threshold value. For example, in the example of the above-described genre, the threshold value is set to 20. The genre in which the number of the deletion candidates is equal to or less than 20 and is closest to 20 is the genre of the level 4. Thus, the item 1 to the item 10 are displayed as the deletion candidates on the deletion candidate page.

Also, in the above embodiment, it has been assumed that the electronic commerce system. S allows the user to exhibit the item in the auction and the exhibition operation is the item-selection related operation. However, the present invention is not limited to the exhibition in the auction, and the present invention may be applied to the operation of starting selling the item as the item-selection related operation. For example, in the electronic commerce system S, the user may be allowed to sell new items or used items.

Also, in the above embodiment, the transaction objects according to the present invention have been applied to the items. However, the transaction objects may be applied to services. Thus, the present invention may be applied to a system capable of service reservation as the electronic commerce system. Examples of the service reservation include an accommodation reservation of an accommodation facility, a use reservation of an athletic facility such as a golf course, and a seat reservation of a transport facility. In this case, the operation of performing the service reservation is included in the operation predetermined in the present invention.

REFERENCE SIGN LIST

1 electronic commerce server
2 shop terminal
3 user terminal
11 communication unit
12 storage unit
12*a* membership information DB
12*b* genre information DB
12*c* shop information DB
12*d* item information DB
12*e* browsing history DB
12*f* purchase history DB
12*g* bookmark information DB
13 input/output interface
14 system control unit
14*a* CPU
14*b* ROM
14*c* RAM
15 system bus
NW network
S electronic commerce system

The invention claimed is:

1. An information processing apparatus comprising:
at least one memory operable to store program code;
at least one processor operable to read the program code and operate as instructed by the program code, the program code including:
registering code configured to cause the at least one processor to, in response to a selection of a transaction object, the transaction object being at least one of an item and a service, by a user on a web page that displays the transaction object, register the transaction object in a reference list, wherein the reference list contains a link to a web page that provides information of each of transaction objects registered in the reference list;
selecting code configured to cause the at least one processor to, when a predetermined operation relating to a first transaction object is performed by the user, select, as candidates for deletion from the reference list, transaction objects associated with the first transaction object, among the transaction objects registered in the reference list, based on reference list information of the user, which is stored in a storage, the reference list information indicating the transaction objects registered in the reference list; and controlling code configured to cause the at least one processor to suggest deleting the deletion candidates selected by the selecting code, to the user.

2. The information processing apparatus according to claim 1, wherein information indicating the transaction objects registered in the reference list among a plurality of transaction objects retrieved in response to a request from the user, and a retrieval condition specified by the user so as to retrieve the transaction objects, are stored as the reference list information in the storage in association with each other, and the selecting code causes the at least one processor to select, as the deletion candidates, transaction objects whose retrieval condition specified for retrieval is matched with the a retrieval condition specified for retrieval of the first transaction object.

3. The information processing apparatus according to claim 2, wherein the selecting code causes the at least one processor to select, as the deletion candidates, transaction objects belonging to a class identical to that of the first transaction object among a plurality of transaction object classes.

4. The information processing apparatus according to claim 2, wherein in a process in which a stage where the transaction object is used is differently determined according to an attribute of the transaction object, the selecting code causes the at least one processor to select, as the deletion candidates, transaction objects used in a stage prior to a stage where the first transaction object.

5. The information processing apparatus according to claim 2, wherein information indicating the transaction objects registered in the reference list, and registration time periods of the transaction objects to the reference list are stored as the reference list information in the storage in association with each other, and the selecting code causes the at least one processor to select, as the deletion candidates, transaction objects whose registration time period to the reference list is identical to the registration time period of the first transaction object.

6. The information processing apparatus according to claim 2, wherein the selecting code causes the at least one processor to select, as the deletion candidates, transaction objects whose browsing time period of transaction object information is identical to the browsing time period of the first transaction object, based on a history stored in a history storage that stores, as a history, a browsing time period of the transaction object information associated with the transaction object by the user and information indicating the transaction object whose transaction object information has been browsed, in association with each other.

7. The information processing apparatus according to claim 2, wherein each of the transaction objects has a use time period, including a start date and an end date, and the selecting code causes the at least one processor to select, as the deletion candidates, transaction objects whose end date of the use time period is determined to be prior to a start date of a use time period of the first transaction object.

8. The information processing apparatus according to claim 1, wherein the selecting code causes the at least one processor to select, as the deletion candidates, transaction objects belonging to a class identical to that of the first transaction object among a plurality of transaction object classes.

9. The information processing apparatus according to claim 8, wherein in a process in which a stage where the transaction object is used is differently determined according to an attribute of the transaction object, the selecting code causes the at least one processor to select, as the deletion candidates, transaction objects used in a stage prior to a stage where the first transaction object.

10. The information processing apparatus according to claim 8, wherein information indicating the transaction objects registered in the reference list, and registration time periods of the transaction objects to the reference list are stored as the reference list information in the storage in association with each other, and the selecting code causes the at least one processor to select, as the deletion candidates, transaction objects whose registration time period to the reference list is identical to the registration time period of the first transaction object.

11. The information processing apparatus according to claim 8, wherein the selecting code causes the at least one processor to select, as the deletion candidates, transaction objects whose browsing time period of transaction object information is identical to the browsing time period of the first transaction object, based on a history stored in a history storage that stores, as a history, a browsing time period of the transaction object information associated with the transaction object by the user and information indicating the transaction object whose transaction object information has been browsed, in association with each other.

12. The information processing apparatus according to claim 8, wherein each of the transaction objects has a use time period, including a start date and an end date, and the selecting code causes the at least one processor to select, as the deletion candidates, transaction objects whose end date of the use time period is determined to be prior to a start date of a use time period of the first transaction object.

13. The information processing apparatus according to claim 1, wherein in a process in which a stage where the transaction object is used is differently determined according to an attribute of the transaction object, the selecting code causes the at least one processor to select, as the deletion candidates, transaction objects used in a stage prior to a stage where the first transaction object is used.

14. The information processing apparatus according to claim 13, wherein information indicating the transaction objects registered in the reference list, and registration time periods of the transaction objects to the reference list are stored as the reference list information in the storage in association with each other, and the selecting code causes the at least one processor to select, as the deletion candidates, transaction objects whose registration time period to the reference list is identical to the registration time period of the first transaction object.

15. The information processing apparatus according to claim 13, wherein the selecting code causes the at least one processor to select, as the deletion candidates, transaction objects whose browsing time period of transaction object information is identical to the browsing time period of the first transaction object, based on a history stored in a history storage that stores, as a history, a browsing time period of the transaction object information associated with the transaction object by the user and information indicating the transaction object whose transaction object information has been browsed, in association with each other.

16. The information processing apparatus according to claim 13, wherein each of the transaction objects has a use time period, including a start date and an end date, and the selecting code causes the at least one processor to select, as the deletion candidates, transaction objects whose end date of the use time period is determined to be prior to a start date of a use time period of the first transaction object.

17. The information processing apparatus according to claim 1, wherein information indicating the transaction objects registered in the reference list, and registration time periods of the transaction objects to the reference list are stored as the reference list information in the storage in association with each other, and the selecting code causes the at least one processor to select, as the deletion candidates, transaction objects whose registration time period to the reference list is identical to the registration time period of the first transaction object.

18. The information processing apparatus according to claim 1, wherein the selecting code causes the at least one processor to select, as the deletion candidates, transaction objects whose browsing time period of transaction object information is identical to the browsing time period of the first transaction object, based on a history stored in a history storage that stores, as a history, a browsing time period of the transaction object information associated with the transaction object by the user and information indicating the transaction object whose transaction object information has been browsed, in association with each other.

19. The information processing apparatus according to claim 1, wherein each of the transaction objects has a use time period, including a start date and an end date, and the selecting code causes the at least one processor to select, as the deletion candidates, transaction objects whose end date of the use time period is determined to be prior to a start date of a use time period of the first transaction object.

20. The information processing apparatus according to claim 1, wherein the selecting code causes the at least one processor to select, as the deletion candidates, transaction objects associated with the first transaction object among the transaction objects included in an attribute range among the transaction objects registered in the reference list, in each of a plurality of attribute ranges determined according to attributes of the transaction objects, which indicate association with the first transaction object, and the controlling code causes the at least one processor to suggest the deletion candidates selected by the selecting code in each of the attribute ranges.

21. An information processing method, which is performed by an information processing apparatus, the information processing method comprising:

in response to a selection of a transaction object, the transaction object being at least one of an item and a service, by a user on a web page that displays the transaction object, registering the transaction object in a reference list, wherein the reference list contains a link to a web page that provides information of each of the transaction objects;

when a predetermined operation relating to a first transaction object is performed by the user, selecting, as candidates for deletion from the reference list, transaction objects associated with the first transaction object, among transaction objects registered in the reference list, based on reference list information of a user, which is stored in a storage, the reference list information indicating the transaction objects registered in the reference list; and suggesting deleting the deletion candidates to the user.

* * * * *